(12) United States Patent
You et al.

(10) Patent No.: US 12,058,636 B2
(45) Date of Patent: Aug. 6, 2024

(54) METHOD FOR IAB MULTIPLEXING AND TIMING RELATIONSHIP, AND NODE USING METHOD

(71) Applicant: LG ELECTRONICS INC., Seoul (KR)

(72) Inventors: Hyangsun You, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 17/783,596

(22) PCT Filed: Dec. 10, 2020

(86) PCT No.: PCT/KR2020/018046
§ 371 (c)(1),
(2) Date: Jun. 8, 2022

(87) PCT Pub. No.: WO2021/118253
PCT Pub. Date: Jun. 17, 2021

(65) Prior Publication Data
US 2023/0034529 A1 Feb. 2, 2023

(30) Foreign Application Priority Data
Dec. 10, 2019 (KR) .................. 10-2019-0163905

(51) Int. Cl.
*H04W 56/00* (2009.01)
(52) U.S. Cl.
CPC .............. *H04W 56/0045* (2013.01)

(58) Field of Classification Search
CPC .................................. H04W 56/0045
(Continued)

(56) References Cited

U.S. PATENT DOCUMENTS

2019/0053184 A1\* 2/2019 Park ............ H04W 76/18
2019/0313433 A1 10/2019 Abedini et al.
(Continued)

FOREIGN PATENT DOCUMENTS

| CN | 110536350 A | 12/2019 |
| CN | 110536377 A | 12/2019 |

(Continued)

OTHER PUBLICATIONS

Vivo, "Enhancements to support NR backhaul link," 3GPP TSG RAN WG1 Meeting #94, R1-1808241, Aug. 2018.
(Continued)

*Primary Examiner* — Nghi H Ly
(74) *Attorney, Agent, or Firm* — BRYAN CAVE LEIGHTON PAISNER LLP

(57) ABSTRACT

The present specification provides a method and an apparatus therefor, in which, in a method for performing an integrated access and backhaul (JAB) operation performed by a node in a wireless communication system, an initial access operation is performed with another node, information about a capability supported by the node is transmitted to the other node, wherein the information about the capability is information informing about at least one timing alignment case supported by the node among a plurality of timing alignment cases, and the IAB operation is performed on the basis of the at least one timing alignment case.

9 Claims, 32 Drawing Sheets

(58) Field of Classification Search
USPC .............. 370/350, 328, 329, 338, 341, 345
See application file for complete search history.

(56) References Cited

U.S. PATENT DOCUMENTS

| | | |
|---|---|---|
| 2019/0349036 A1 | 11/2019 | Wang et al. |
| 2019/0349079 A1 | 11/2019 | Novlan et al. |
| 2019/0350023 A1 | 11/2019 | Novlan et al. |

FOREIGN PATENT DOCUMENTS

| | | |
|---|---|---|
| CN | 110536407 A | 12/2019 |
| WO | 2019194737 | 10/2019 |
| WO | 2019226016 A1 | 11/2019 |
| WO | 2020202190 A1 | 10/2020 |

OTHER PUBLICATIONS

Intel Corporation, "PHY layer enhancements for NR IAB," 3GPP TSG RAN WG1 #95, R1-1812486, Nov. 2018.

NTT Docomo, Inc., "Discussion on enhancements to support NR backhaul links," 3GPP TSG RAN WG1 Meeting #95 R1-1813316, Nov. 2018.

AT&T, "TP for 38.874 on PHY Enhancements for NR IAB," 3GPP TSG RAN WG1 Meeting #95, R1-1814190, Nov. 2018.

Samsung, "Support of Case 1 OTA Timing Alignment," 3GPP TSG RAN WG1 Ad-Hoc Meeting 1901, R1-1901046, Jan. 2019.

3GPP; TSG RAN; NR; Study on Integrated Access and Backhaul; Release 16, 3GPP TR 38.874 V16.0.0, Jan. 10, 2019, see sections 7.2.1 and 7.4.

Ericsson, Remaining issues on IAB resource configuration and multiplexing, R1-1912133, 3GPP TSG RAN WG1 Meeting #99, Reno, USA, Nov. 8, 2019, see sections 2-2.1.

NTT Docomo, Inc., Mechanism to support the "case-1" OTA timing alignment, R1-1911167, 3GPP TSG RAN WG1 Meeting #98b, Chongqing, China, Oct. 4, 2019.

Ericsson, "Timing of IAB-node transmissions", 3GPP TSG-RAN WG1 Meeting #85, R1-1813568, Nov. 12-16, 2018.

AT&T, "Summary of 7.2.3.1 Enhancements to support NR backhaul links", 3GPP TSG RAN WG1 Meeting #95, R1-1814127, Nov. 12-16, 2018.

AT&T, "Summary of 7.2.3.4 Mechanisms for resource multiplexing among backhaul and access links", 3GPP TSG RAN WG1 Meeting Ad-Hoc Meeting 1901, R1-1901455, Jan. 21-25, 2019.

LG Electronics, "Discussions on resource multiplexing among backhaul and access links", 3GPP TSG RAN WG1 #97, R1-1906724, May 13-17, 2019.

Qualcomm, "New WID: Integrated Access and Backhaul for NR", 3GPP TSG RAN Meeting #82, RP-182322, Dec. 10-13, 2018.

* cited by examiner

FIG. 24 receive information about the capability
supported by the child node from the child node — S2410
(the information on the capability
may be information informing of
at least one timing alignment case supported
by the child node among a plurality of
timing alignment cases)

METHOD FOR IAB MULTIPLEXING AND TIMING RELATIONSHIP, AND NODE USING METHOD

This application is the National Stage filing under 35 U.S.C. 371 of International Application No. PCT/KR2020/018046 filed on Dec. 10, 2020, which claims priority to Korean Patent Application No. 10-2019-0163905 filed on Dec. 10, 2019, the contents of which are all hereby incorporated by reference herein in their entirety.

BACKGROUND OF THE DISCLOSURE

Field of the Disclosure

The present specification relates to wireless communication.

Related Art

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new radio access technology (new RAT or NR).

On the other hand, integrated access and backhaul link may be provided. Hereinafter, in this specification, features for Integrated Access Backhaul (IAB) will be provided.

SUMMARY OF THE DISCLOSURE

Technical Solutions

According to an embodiment of the present specification, a method for transmitting information about the capabilities supported by the node to another node, where the information on the capability is information indicating at least one timing alignment case supported by the node among a plurality of timing alignment cases, and performing the IAB operation based on the at least one timing alignment case may be provided.

EFFECTS OF THE DISCLOSURE

According to the present specification, when the node performs the IAB operation, it may become clear on which timing alignment case the IAB operation will be performed based on, so that the stability and efficiency of wireless communication can be increased.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

BRIEF DESCRIPTION OF THE DRAWINGS

FIG. 24 is a flowchart of a method of receiving information about capabilities (from the perspective of another node) according to an embodiment of the present specification.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in this specification, "A, B or C" refers to "only A", "only B", "only C", or "any combination of A, B and C".

A forward slash (/) or comma used herein may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" can be interpreted the same as "at least one of A and B".

In addition, in the present specification, "at least one of A, B and C" means "only A", "only B", "only C", or "any combination of A, B and C". In addition, "at least one of A, B or C" or "at least one of A, B and/or C" can mean "at least one of A, B and C".

In addition, parentheses used in the present specification may mean "for example". Specifically, when described as "control information (PDCCH)", "PDCCH" may be proposed as an example of "control information". In other words, "control information" of the present specification is not limited to "PDCCH", and "PDDCH" may be suggested as an example of "control information". In addition, even when described as "control information (i.e., PDCCH)", "PDCCH" may be proposed as an example of "control information".

In the present specification, technical features that are individually described in one drawing may be implemented individually or at the same time.

Figure 1:
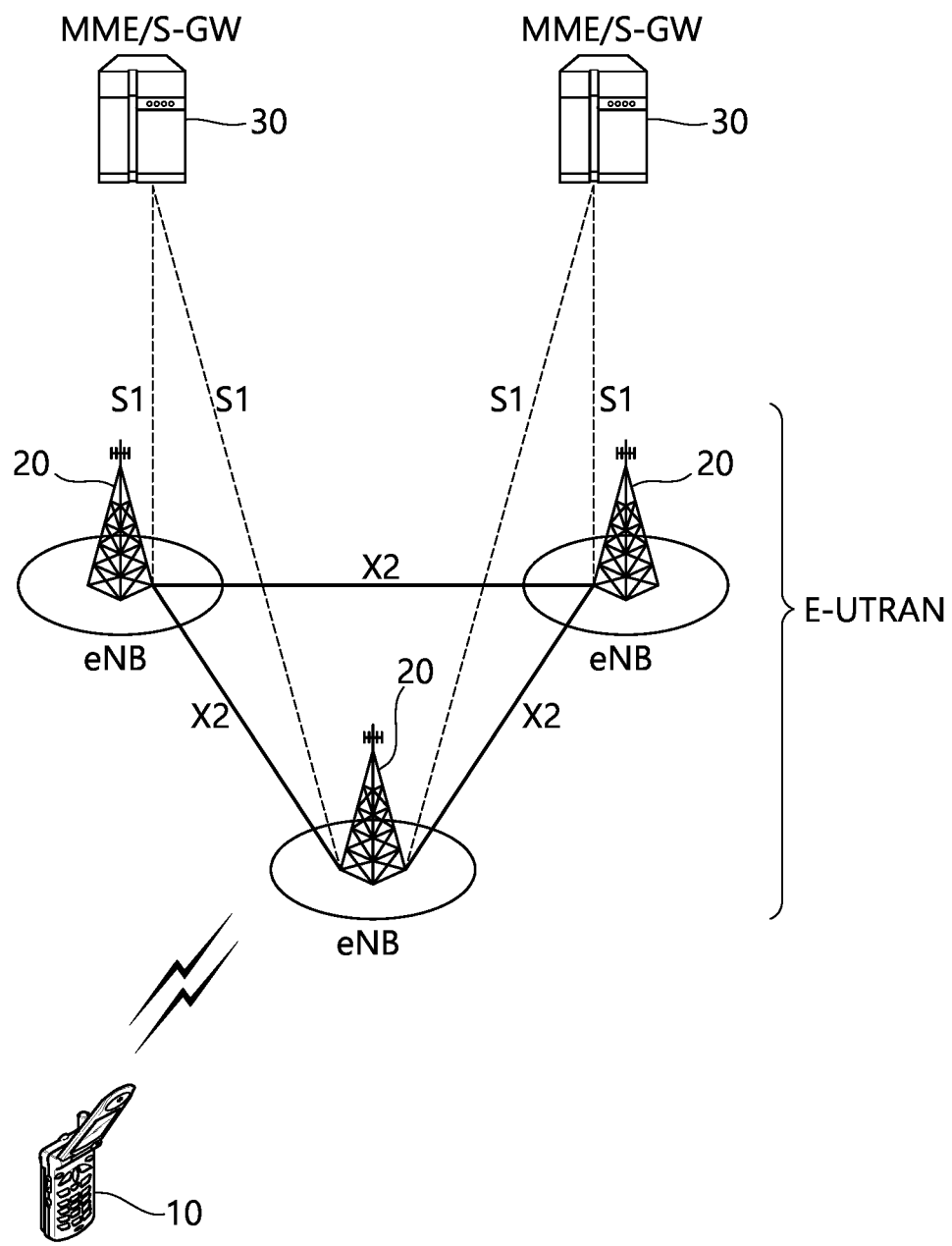
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, and so on. The BS (20) is generally a fixed station that communicates with the UE (10) and may be referred to as another terminology, such as an evolved node-B (eNB), a base transceiver system (BTS), an access point, and so on.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
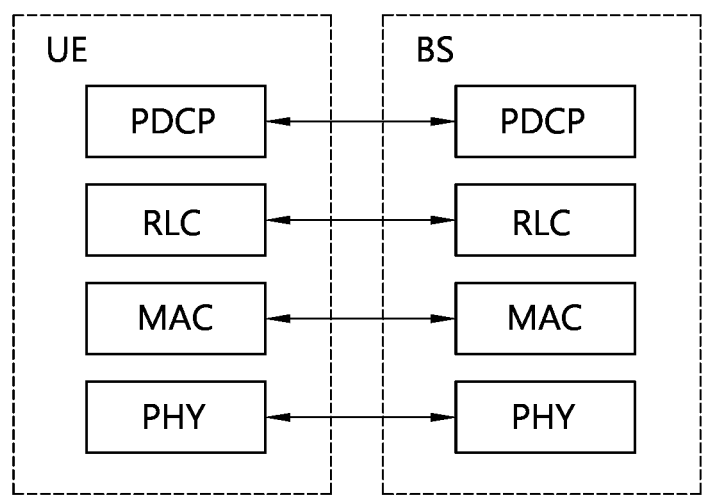
FIG. 2 is a diagram showing a wireless protocol architecture for a user plane.
Figure 3:
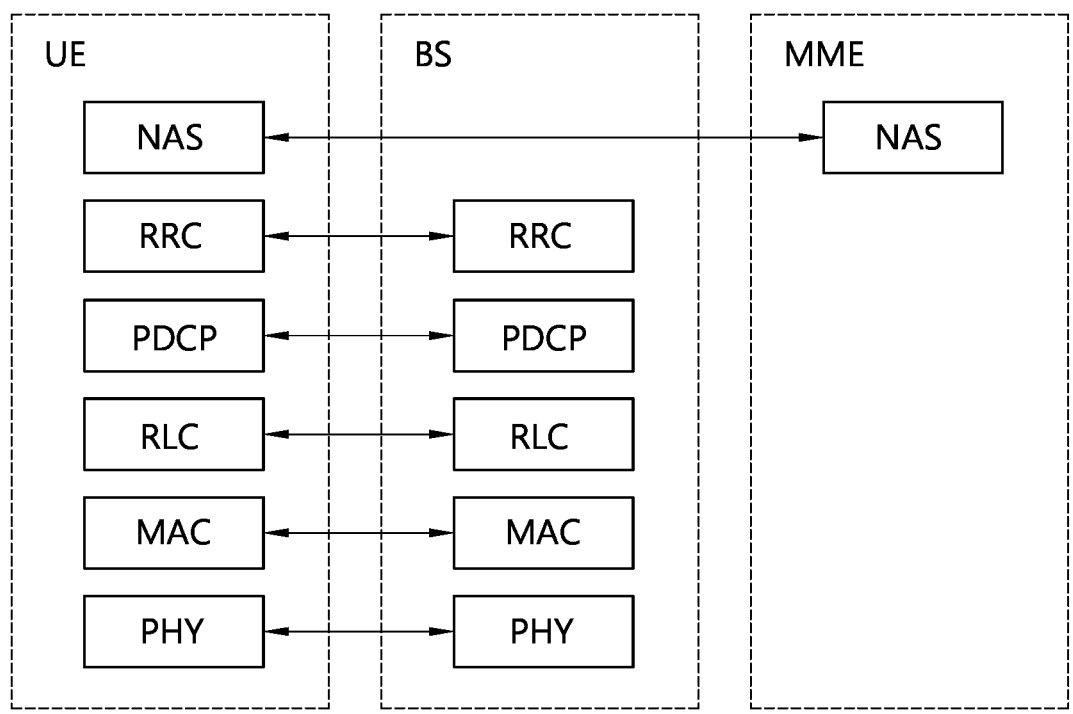
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

Hereinafter, a new radio access technology (new RAT, NR) will be described.

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new RAT or NR.

Figure 4:
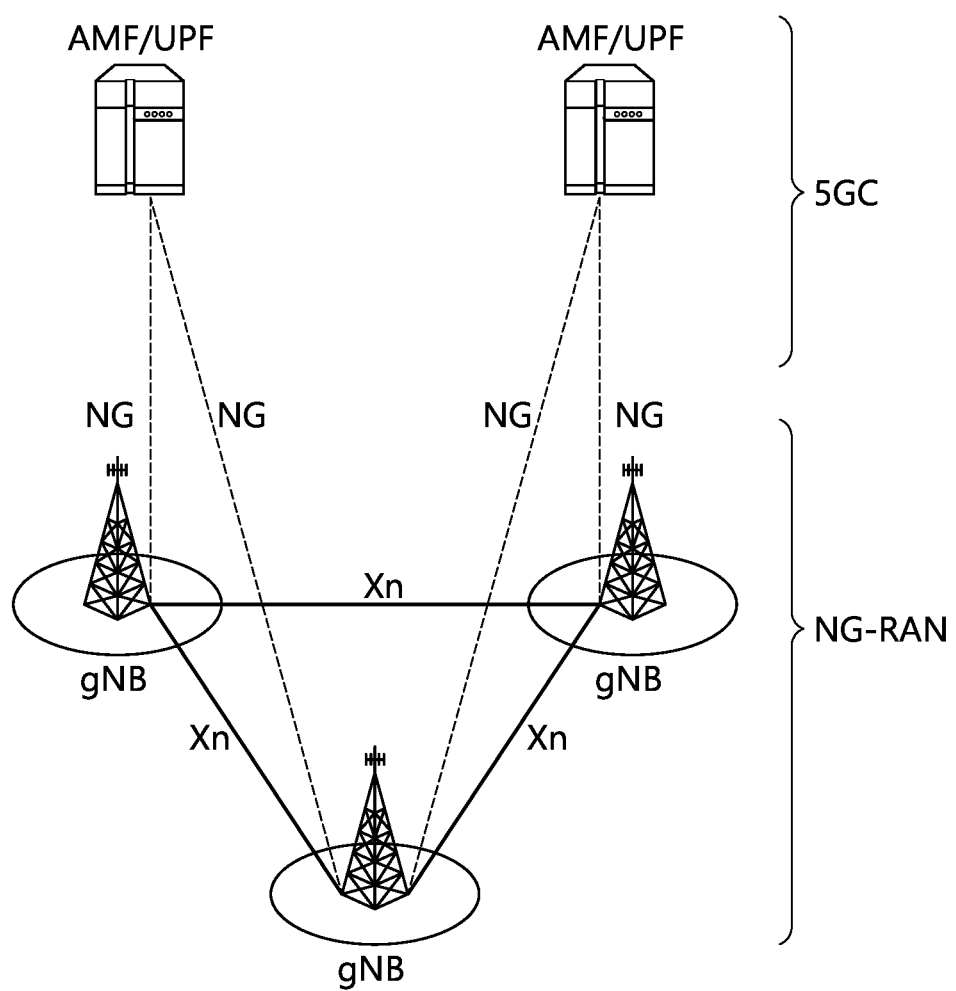
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
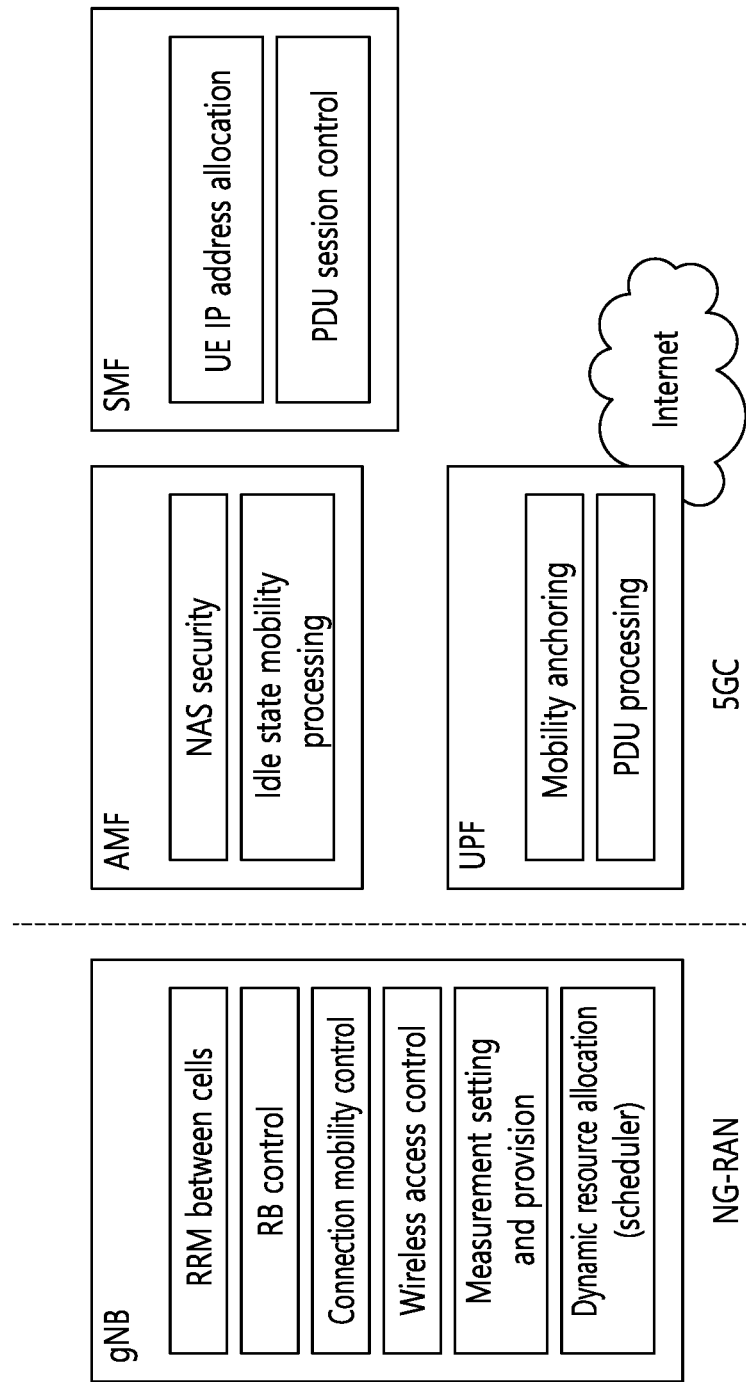
FIG. 5 illustrates functional partitioning between NG-RAN and 5GC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 6:
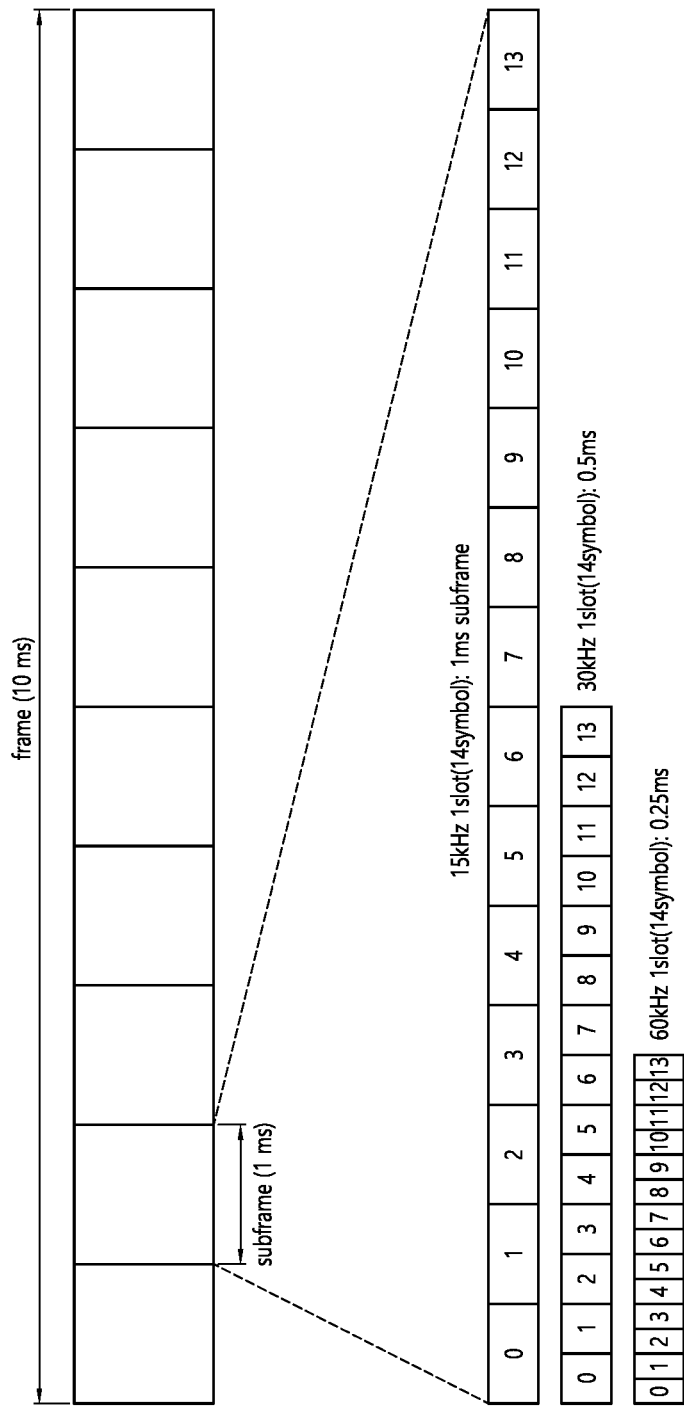
FIG. 6 illustrates a frame structure applicable in NR.

FIG. 6 illustrates a frame structure applicable in NR.

Referring to FIG. 6, a frame may consist of 10 milliseconds (ms) and may include 10 subframes of 1 ms.

A subframe may include one or a plurality of slots according to subcarrier spacing.

Table 1 below shows subcarrier spacing configuration $\mu$.

TABLE 1

| $\mu$ | $\Delta f = 2^{\mu} \cdot 15 [kHz]$ | CP(Cyclic Prefix) |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number of slots in a frame ($N^{frame,\mu}_{slot}$), the number of slots in a subframe ($N^{subframe,\mu}_{slot}$), and the number of symbols in a slot ($N^{slot}_{symb}$) according to the subcarrier spacing configuration $\mu$.

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 shows $\mu$=0, 1, and 2.

A physical downlink control channel (PDCCH) may include one or more control channel elements (CCEs) as shown in Table 3 below.

TABLE 3

| Aggregation level | Number of CCEs |
|---|---|
| 1 | 1 |
| 2 | 2 |

TABLE 3-continued

| Aggregation level | Number of CCEs |
| --- | --- |
| 4 | 4 |
| 8 | 8 |
| 16 | 16 |

In other words, the PDCCH may be transmitted through a resource including 1, 2, 4, 8 or 16 CCEs. Here, the CCE includes six resource element groups (REGs), and one REG includes one resource block in the frequency domain and one orthogonal frequency division multiplexing (OFDM) symbol in the time domain. The following technologies/characteristics may be applied to NR.

<Self-Contained Subframe Structure>

Figure 7:
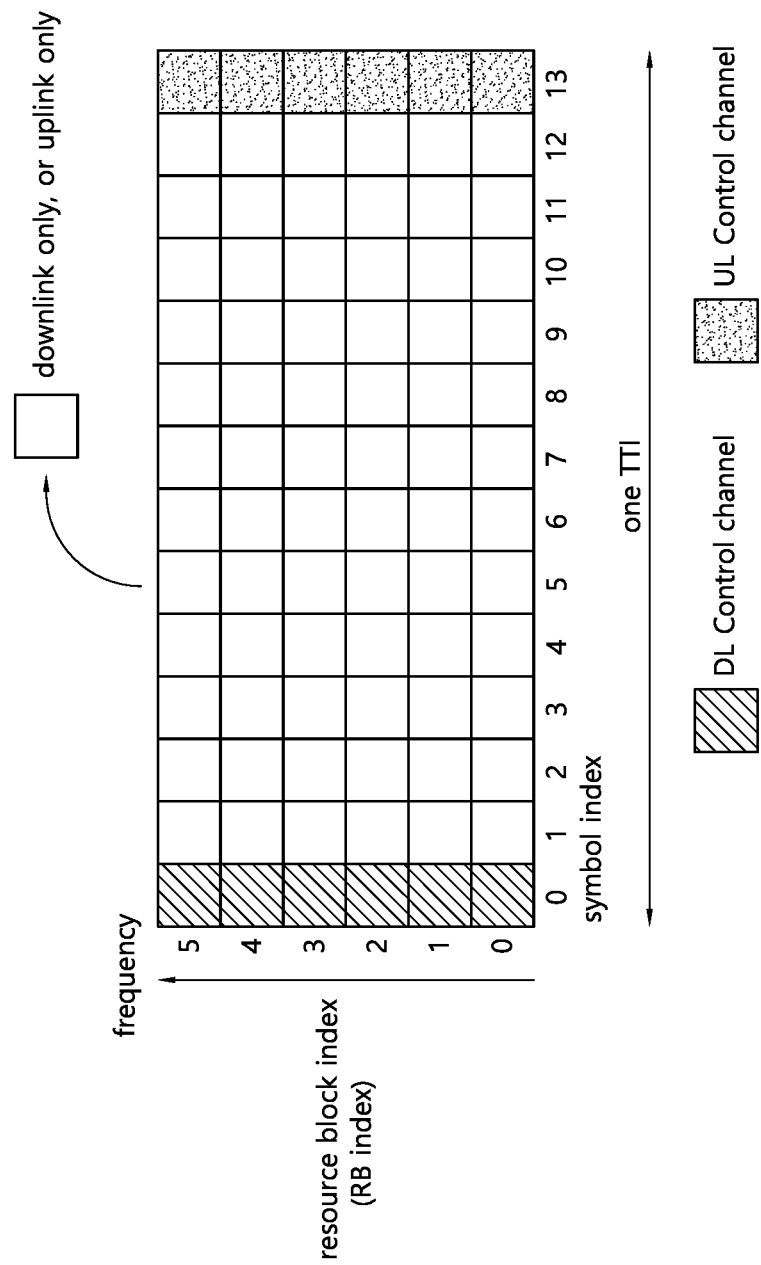
FIG. 7 illustrates an example of a frame structure for the new radio access technology (new RAT).

FIG. 7 illustrates an example of a frame structure for the new radio access technology (new RAT).

In NR, as a purpose for minimizing latency, as shown in FIG. 7, a structure having a control channel and a data channel being processed with Time Division Multiplexing (TDM), within one TTI, may be considered as one type of frame structure.

In FIG. 7, an area marked with slanted lines represents a downlink control area, and an area marked in black represents an uplink control area. An area marked in black may be used for downlink (DL) data transmission or may be used for uplink (UL) data transmission. The characteristic of such structure is that, since downlink (DL) transmission and uplink (UL) transmission are carried out sequentially, DL data is sent out (or transmitted) from a subframe, and UL Acknowledgement/Not-acknowledgement (ACK/NACK) may also be received in the subframe. As a result, time needed until data retransmission, when a data transmission error occurs, may be reduced, and, accordingly, latency in the final data transfer (or delivery) may be minimized.

In the above-described data and control TDMed subframe structure, a time gap is needed for a transition process (or shifting process) from a transmission mode to a reception mode of the base station and UE, or a transition process (or shifting process) from a reception mode to a transmission mode of the base station and UE. For this, in a self-contained subframe structure, some of the OFDM symbols of a time point where a transition from DL to UL occurs may be configured as a guard period (GP).

Figure 8:
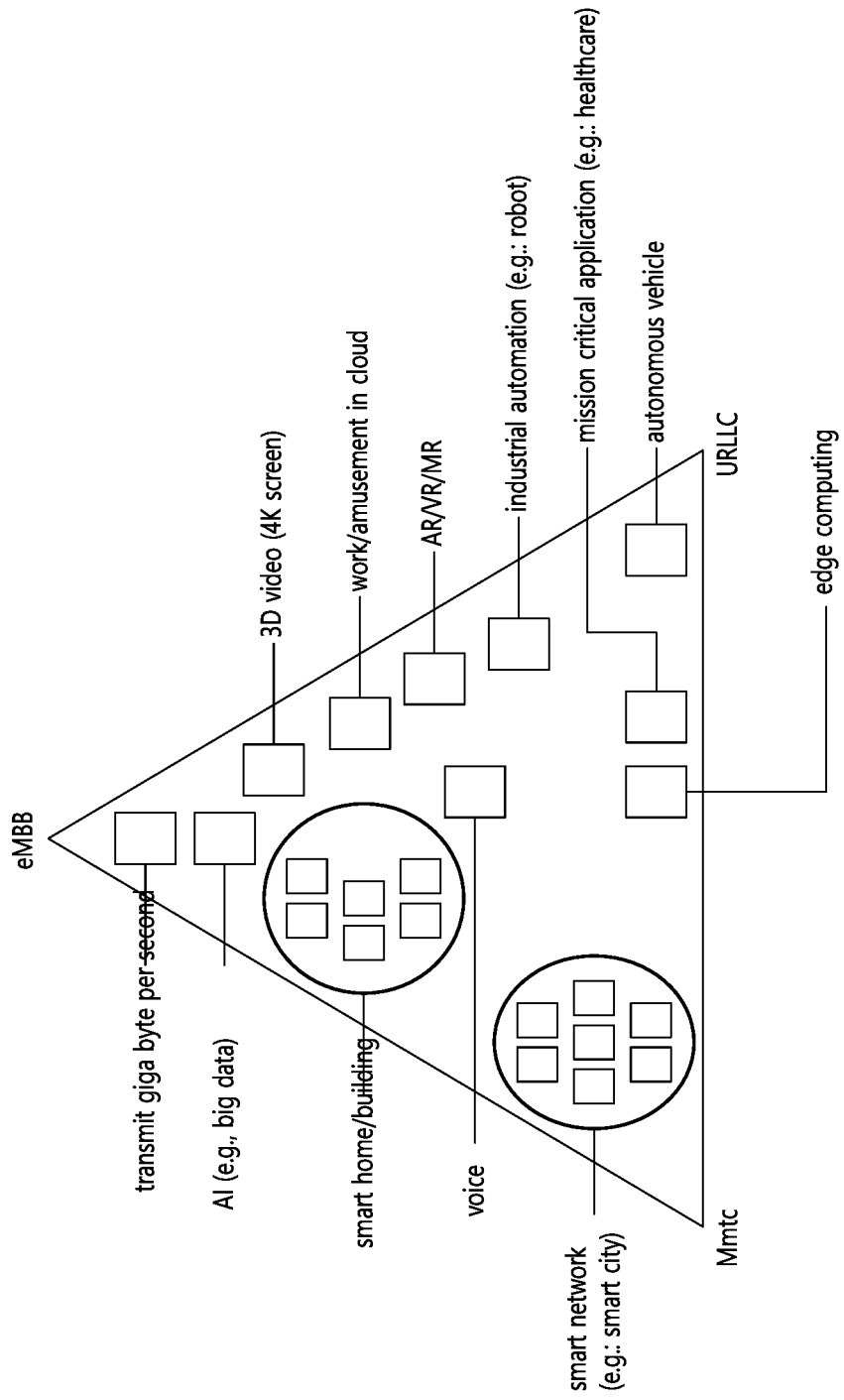
FIG. 8 shows examples of 5G usage scenarios to which the technical features of the present specification can be applied.

FIG. 8 shows examples of 5G usage scenarios to which the technical features of the present specification can be applied. The 5G usage scenarios shown in FIG. 8 are only exemplary, and the technical features of the present specification can be applied to other 5G usage scenarios which are not shown in FIG. 8.

Referring to FIG. 8, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 8 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Figure 9:
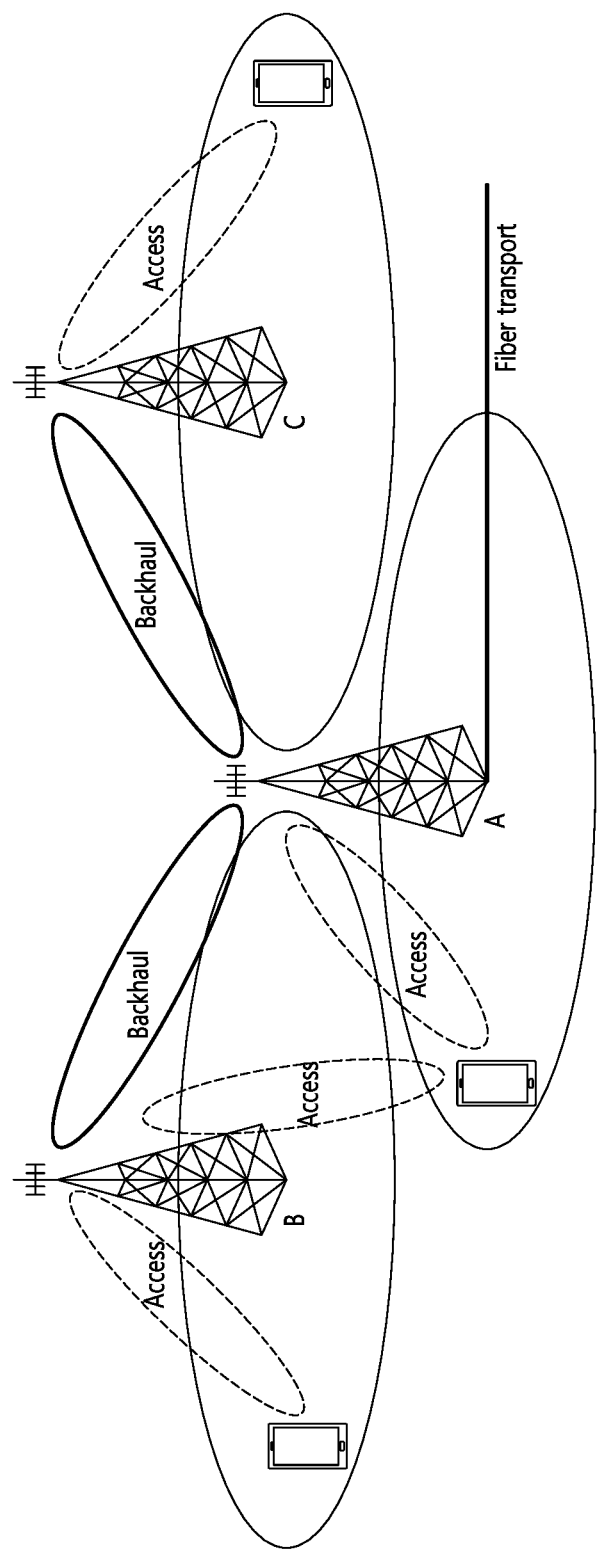
FIG. 9 schematically illustrates an example of integrated access and backhaul links.

FIG. 9 schematically illustrates an example of integrated access and backhaul links.

An example of a network having such integrated access and backhaul links is shown in FIG. 9. Here, a relay node (rTRP) can multiplex access and backhaul links in time, frequency or space (e.g., beam based operation).

Operations of different links may be at the same frequency or different frequencies (which may also be referred to as "in-band" and "out-band" relays). Although efficient support of the out-band relay is important in some NR deployment scenarios, it is very important to understand in-band operation requirements that mean a close interaction with an access link operating at the same frequency in order to accept duplex constraint and prevent/mitigate interference.

In addition, operation of an NR system in mmWave spectrum can present some unique challenges including experiencing serious short-term blocking that may not be easily mitigated by a current RRC based handover mechanism due to a larger time scale necessary to complete a procedure than short-term blocking.

To overcome short-term blocking in the mmWave system, a fast RAN based mechanism (which does not necessarily require intervention of a core network) for switching between rTRPs.

Necessity for mitigating short-term blocking for NR operation in the mmWave spectrum along with requirement for easier deployment of a self-backhauled NR cell may cause necessity of development of an integrated framework that enables rapid switching of access and backhaul links.

In addition, over-the-air (OTA) coordination between rTRPs can be regarded as mitigation of interference and support of end-to-end route selection and optimization.

The following requirements and aspects may need to be solved by integrated access and backhaul (IAB) for NR.

Efficient and flexible operation for in-band and out-band relays in indoor and outdoor scenarios Multiple hops and redundant connection End-to-end route selection and optimization Support of backhaul link with high spectrum efficiency Legacy NR UE support Legacy new RAT was designed to support half-duplex devices. Further, half-duplex of an IAB scenario deserves to be supported and to become an object. In addition, a full-duplex IAB device can be researched.

In the IAB scenario, a donor gNB (DgNB) needs to schedule all links between related relay nodes (RNs) and UEs unless each RN has scheduling capability. In other words, the DgNB can collect traffic information in all related RNs, determine schedules with respect to all links and then notify each RN of schedule information.

Figure 10:
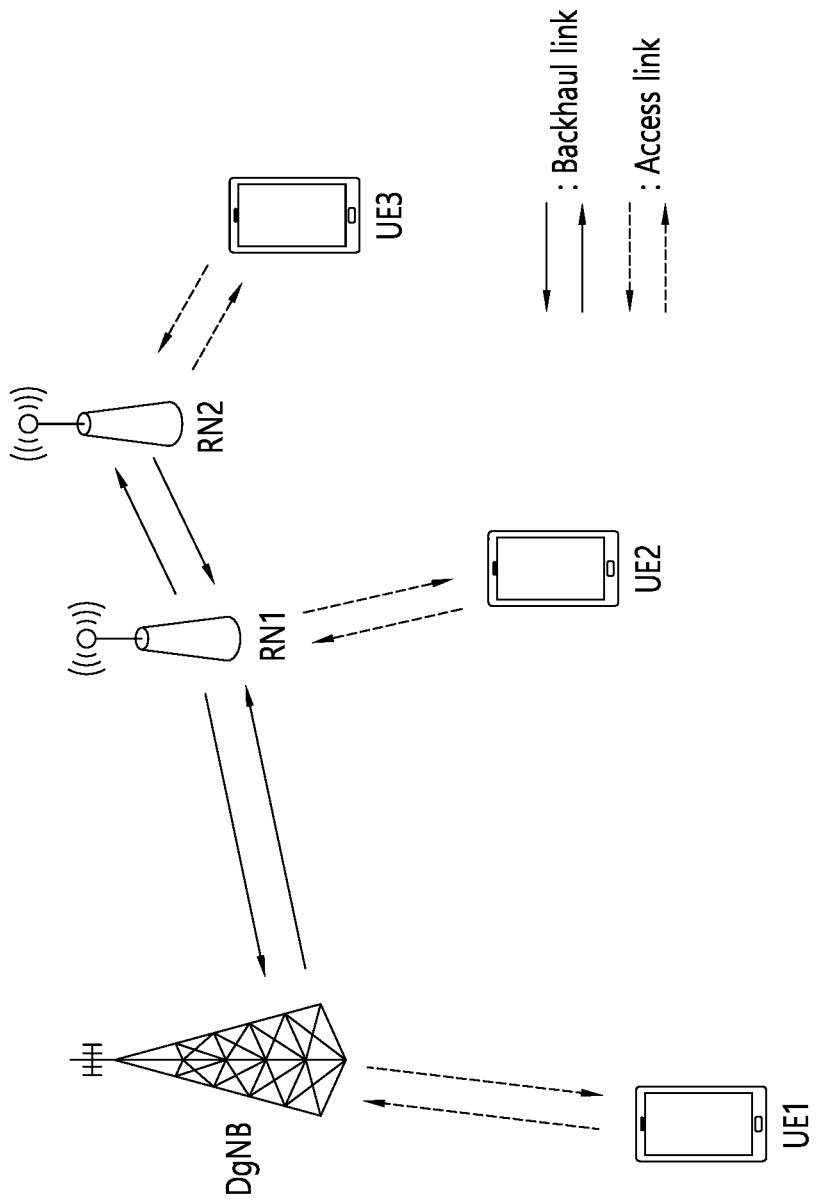
FIG. 10 schematically illustrates an example of a link between a DgNB, an RN, and a UE.

FIG. 10 schematically illustrates an example of a link between a DgNB, an RN, and a UE.

According to FIG. 10, for example, a link between DgNB and UE1 is an access link (access link), a link between RN1 and UE2 is also an access link, and a link between RN2 and UE3 may also mean an access link.

Similarly, according to FIG. 10, for example, a link between DgNB and RN1 and a link between RN1 and RN2 may mean a backhaul link.

For example, backhaul and access links can be configured, and in this case, the DgNB can receive scheduling requests of UE2 and UE3 as well as a scheduling request of UE1. Then, the DgNB can determine scheduling of two backhaul links and three access links and signal the scheduling result. Accordingly, this centralized scheduling includes delayed scheduling and waiting time problems.

On the other hand, distributed scheduling can be performed if each RN has scheduling capability. Then, immediate scheduling can be performed for an uplink scheduling request of a UE and backhaul/access links can be used more flexibly in response to surrounding traffic conditions.

Figure 11:
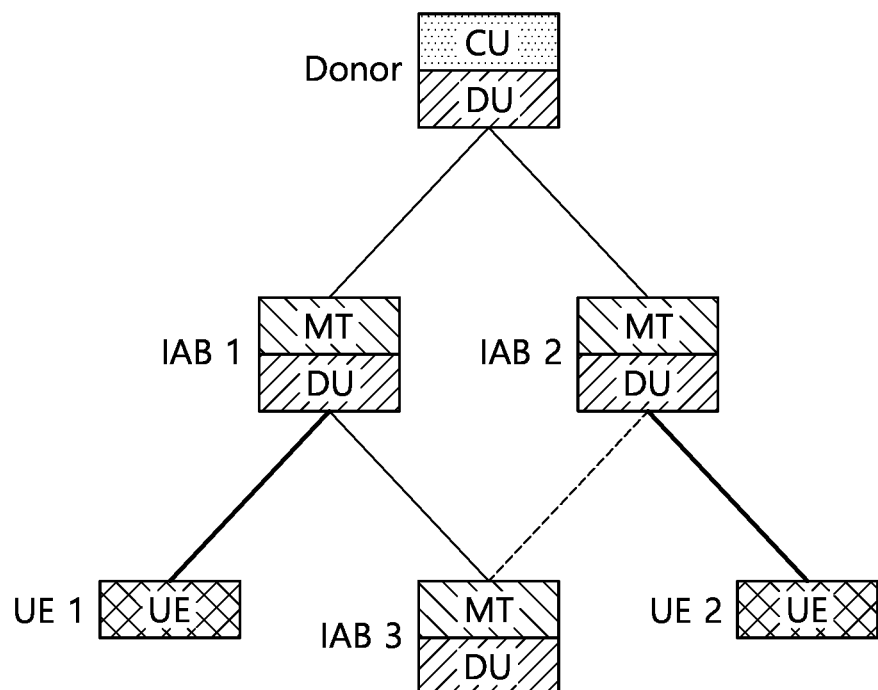
FIG. 11 schematically shows an example of a backhaul link and an access link.

FIG. 11 schematically shows an example of a backhaul link and an access link.

As shown in FIG. 11, a link between a donor node and an IAB node or a link between IAB nodes is called a backhaul link. On the other hand, the link between the donor node and the UE or the link between the IAB node and the UE is called an access link. That is, a link between an MT and a parent DU or a link between a DU and a child MT may be referred to as a backhaul link, and a link between the DU and the UE may be referred to as an access link.

Figure 12:
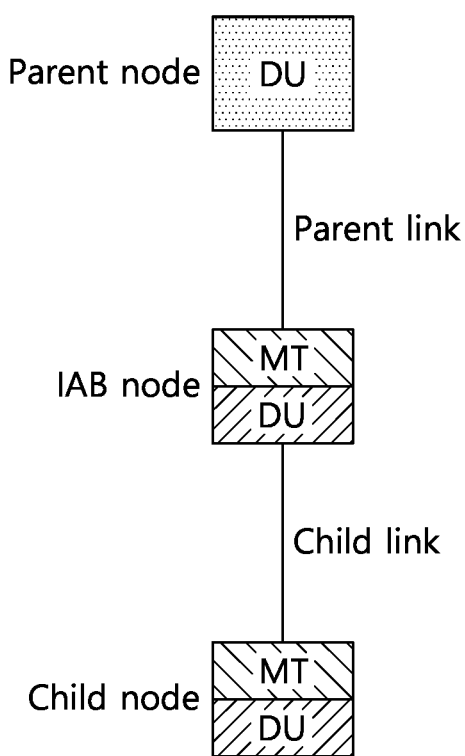
FIG. 12 schematically shows an example of a parent link and a child link.

FIG. 12 schematically shows an example of a parent link and a child link.

As shown in FIG. 12, the link between the IAB node and the parent node is called a parent link, and the link between the IAB node and the child node/UE is called a child link. That is, the link between the MT and the parent DU is called a parent link, and the link between the DU and the child MT/UE is called a child link.

However, depending on the interpretation or perspective, the link between the IAB node and the parent node is called a backhaul link, and the link between the IAB node and the child node/UE is also called an access link.

Based on such a discussion, the MT configuration method for the IAB node considered in the present specification will be described below.

Hereinafter, the proposal of the present specification will be described.

The IAB node receives the MT configuration configured to inform the link direction information for the parent link between the parent node and itself for communication with the parent node. Also, for communication with child nodes, the IAB node is configured with a DU configuration that informs the link direction and link availability information for the child link between the child node/access UE and itself. In this case, a method is proposed in which the IAB node determines which link among the parent link and the child link can be used for communication at a specific time by the IAB node according to the DU configuration and the MT configuration.

Figure 13:
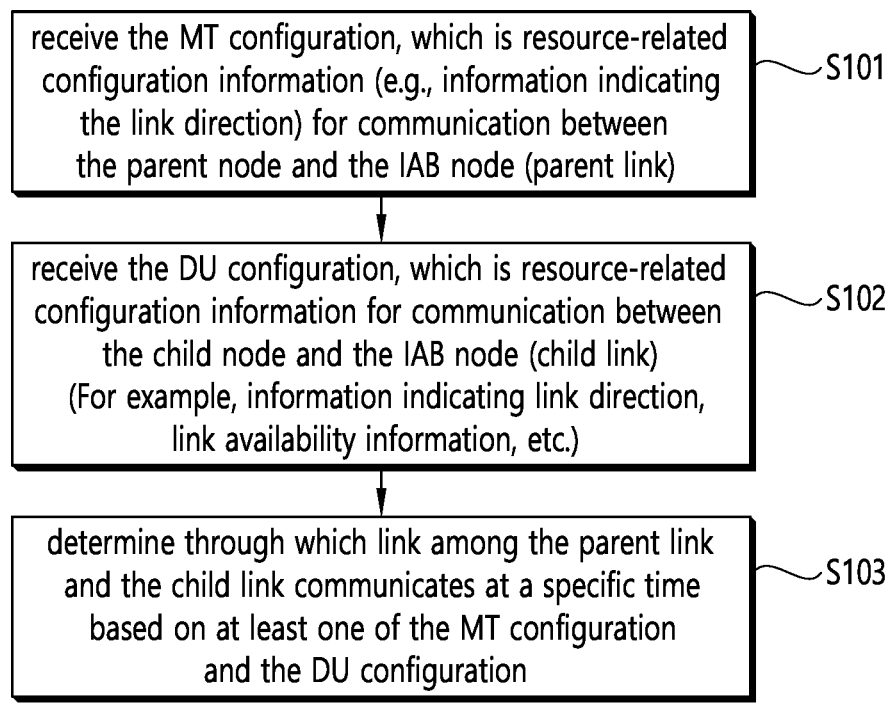
FIG. 13 shows an example in which the IAB node determines the link direction of a specific resource.

FIG. 13 shows an example in which the IAB node determines the link direction of a specific resource.

According to FIG. 13, the IAB node may receive the MT configuration, which is resource-related configuration information (e.g., information indicating the link direction) for communication between the parent node and the IAB node (parent link) (S101). In this regard, a more specific embodiment is the same as described above (and will be described later), so for convenience of description, repeated description of overlapping content will be omitted.

The IAB node may receive the DU configuration, which is resource-related configuration information for communication between the child node and the IAB node (child link) (For example, information indicating link direction, link availability information, etc.) (S102). In this regard, a more specific embodiment is the same as described above (and will be described later), so for convenience of description, repeated description of overlapping content will be omitted.

The IAB node may determine through which link among the parent link and the child link communicates at a specific time based on at least one of the MT configuration and the DU configuration (S103). In this regard, a more specific embodiment is the same as described above (and will be described later), so for convenience of description, repeated description of overlapping content will be omitted.

Additional advantages, objects, and features of this specification will be set forth in part in the description that follows, and will become apparent to those skilled in the art upon reviewing the following, or may be learned, in part, from practice of the specification. The objects and other advantages of the present specification may be realized and attained by means of the appended drawings as well as the appended claims and the structures particularly pointed out in the claims.

The configuration, operation, and other features of the present specification may be understood by the embodiments of the present specification described with reference to the accompanying drawings.

The content of the present specification is described assuming an in-band environment, but may also be applied in an out-band environment. In addition, the content of the present specification is described in consideration of an environment in which a donor gNB (DgNB), a relay node (RN), and a UE perform a half-duplex operation, and it can also be applied in an environment in which the donor gNB (DgNB), the relay node (RN), and/or the UE perform full-duplex operation.

In this specification, for convenience of description, when RN1 and RN2 exist, when RN1 is connected to RN2 by a backhaul link and relays data transmitted and received to RN2, RN1 is referred to as a parent node of RN2, and RN2 is referred to as a child node RN of RN1.

The terms used in this specification may be as follows.

IAB node (IAB-node): a RAN node that supports radio access to the terminal(s) and supports wireless backhaul of access traffic.

IAB donor (IAB-donor): a RAN node that provides the UE's interface to the core network and wireless backhaul function to the IAB node(s).

Hereinafter, each abbreviation may correspond to an abbreviation of the following terms.
    IAB: Integrated Access and Backhaul
    CSI-RS Channel State Information Reference Signal
    DgNB: Donor gNB
    AC: Access
    BH: Backhaul
    DU: Distributed Unit
    MT: Mobile terminal
    CU: Centralized Unit
    IAB-MT: IAB mobile terminal
    NGC: Next-Generation Core network
    SA: Stand-alone
    NSA: non-stand-alone
    EPC: Evolved Packet Core On the other hand, from the IAB node MT point of view, the time domain resource (s) of the following type (s) may be indicated for the parent link.
    downlink time resource;
    uplink time resource;
    Flexible time resources.

From an IAB node DU perspective, a child link may have time domain resource(s) of the following type(s).
    downlink time resource;
    uplink time resource;
    flexible time resources;
    Unavailable time resource(s) (resource(s) not used for communication on DU child link(s)).

The downlink, uplink, and flexible time resource type(s) of the DU child link may belong to one of the following two categories.

Hard: this time resource is always available for DU child links;

Soft: The availability of the corresponding time resource for the DU child link may be explicitly and/or implicitly controlled by the parent node.

Unavailable time resource(s) (resource(s) not available for communication on DU child link(s))

From the point of view of the IAB node DU, the child link has time resources of the downlink (DL), uplink (UL), and flexible (F) types.

Each of the downlink, uplink and flexible time resources of the DU child link may be hard, soft or NA resources. Here, the unavailable (NA) resource may mean that the resource is not used for communication on the DU child link(s). As described above, hard resources may mean that communication is always possible in the DU child link. However, in the case of soft resources, communication availability in the DU child link may be explicitly and/or implicitly controlled by the parent node.

In such a situation, the configuration on link (resource) direction (DL/UL/F) of time resource for DU child link and link (resource) availability (hard/soft/NA) can be named 'DU configuration'.

This configuration can be used for effective multiplexing and interference processing among IAB node(s). For example, this configuration can be used to indicate which link is valid for the time resource between parent link and child link.

In addition, since configuring only a subset of the child node(s) can utilize time resources for DU operation, it can be used to adjust interference among the child node(s).

Considering this aspect, the DU configuration may be more effective when the DU configuration is semi-static and can be configured specifically for the IAB node.

The availability of soft resources can be dynamically configured through L1-based implicit/explicit signaling. "IA" means that the DU resource is explicitly or implicitly marked as available, and "INA" means that the DU resource is explicitly or implicitly marked as unavailable. Dynamic L1-based signaling may indicate whether the DU soft resource is "IA" or "INA".

On the other hand, similar to the SFI configuration for the access link, the IAB node MT may have three types of time resources for the parent link: downlink (DL), uplink (UL), and flexible (F).

Figure 14:
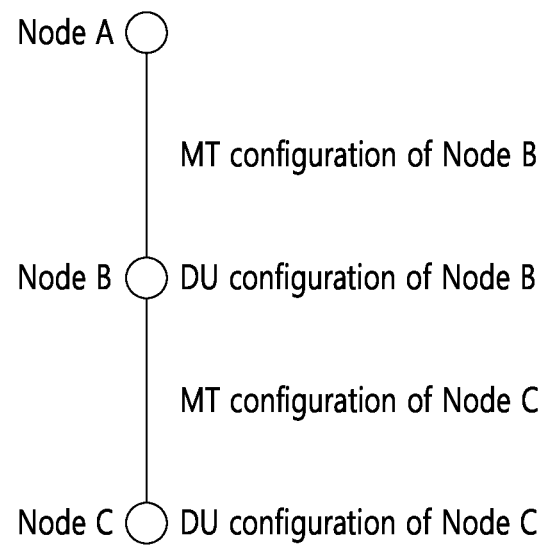
FIG. 14 schematically shows the configuration between nodes.

FIG. 14 schematically shows the configuration between nodes.

As in ① of FIG. 14, the IAB node receives the MT configuration configured to inform the link direction information about the parent link between the parent node and itself for communication with the parent node. In addition, as in ② of FIG. 14, the DU configuration is configured to inform the link direction and link use validity information that can be used for communication with one's own child link.

DU and MT existing in the same IAB node (or co-located) cannot operate at the same time due to intra-node interference, slot/symbol boundary misalignment, power sharing, etc., and may operate in TDM.

On the other hand, multiplexing of SDM/FDM may be used between the DU and the MT. This is applicable, for example, when the DU and the MT use different panels and there is little interference between the panels. In this case, DU and MT existing in the same IAB node (or co-located) can transmit or receive at the same time, it is impossible for the DU and the MT to transmit and receive, respectively, or to simultaneously perform reception and transmission.

Alternatively, FD (Full duplexing) may be used between the DU and the MT. This is applicable when, for example, there is little interference between the DU and the MT, such as when the frequency domain in which the DU operates and the frequency domain in which the MT operates are far apart. In this case, the DU and the MT that exist in the same IAB node (or are co-located) can freely transmit and receive at the same time. DU and MT DU and MT can transmit or receive at the same time, it is also possible for the DU and the MT to simultaneously perform transmission and reception or reception and transmission, respectively.

Figure 15:
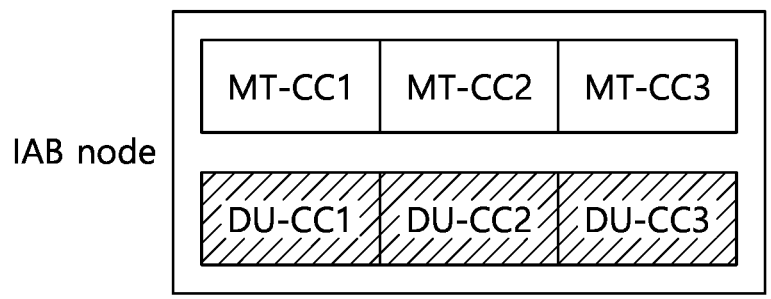
FIG. 15 schematically shows an example of CC in DU and MT.

FIG. 15 schematically shows an example of CC in DU and MT.

MT and DU of the IAB node may be configured with a plurality of CC (component carrier). In this case, different CCs may operate in the same or different frequency domains or may use the same or different panels. For example, as shown in FIG. 15, three CCs may exist for each of the MT and the DU in the IAB node. In the figure, the three CCs in the MT are named MT-CC1, MT-CC2, and MT-CC3, respectively and the three CCs existing in the DU are called DU-CC1, DU-CC2, and DU-CC3, respectively.

At this time, between the specific CC of the MT and the specific CC of the DU, one multiplexing scheme of TDM, SDM/FDM, and FD may be applied. For example, when a specific MT-CC and a DU-CC are located in different inter-band frequency domains, FD may be applied between the corresponding MT-CC and the DU-CC. On the other hand, the TDM scheme may be applied between the MT-CC and the DU-CC located in the same frequency domain.

In FIG. 15, MT-CC1, MT-CC2, DU-CC1, DU-CC2 has f1 as a center frequency, MT-CC3, DU-CC3 has f2 as a center frequency, f1 and f2 may be located in inter-band with each other. In this case, it operates in TDM with DU-CC1 and DU-CC2 from the position of MT-CC1 (or the position of MT-CC2), it can operate in FD with DU-CC3. On the other hand, from the standpoint of MT-CC3, it operates as FD with DU-CC1 and DU-CC2, it can operate in TDM with DU-CC3.

On the other hand, a different multiplexing scheme between the MT and the DU may be applied even within the same CC. For example, a plurality of parts may exist within the CC of the MT and/or DU. Such a part may refer to, for example, an antenna having the same center frequency but a different physical location or a link transmitted through different panels. Or, for example, the center frequency may mean a link that is the same but transmitted through different BWPs. In this case, for example, when two parts exist in DU-CC1, a multiplexing type operating with a specific MT-CC or a specific part in a specific MT-CC may be different for each part. The content of the following specification describes a case in which the multiplexing type applied to each pair of the MT CC and the DU CC may be different, contents of the specification may be extended and applied even when MT and DU are divided into a plurality of parts, and a multiplexing type applied to each pair of CCs and parts of MTs and CCs and parts of DUs may be different.

The DU-CC may be interpreted as being replaced with a DU-cell.

Figure 16:
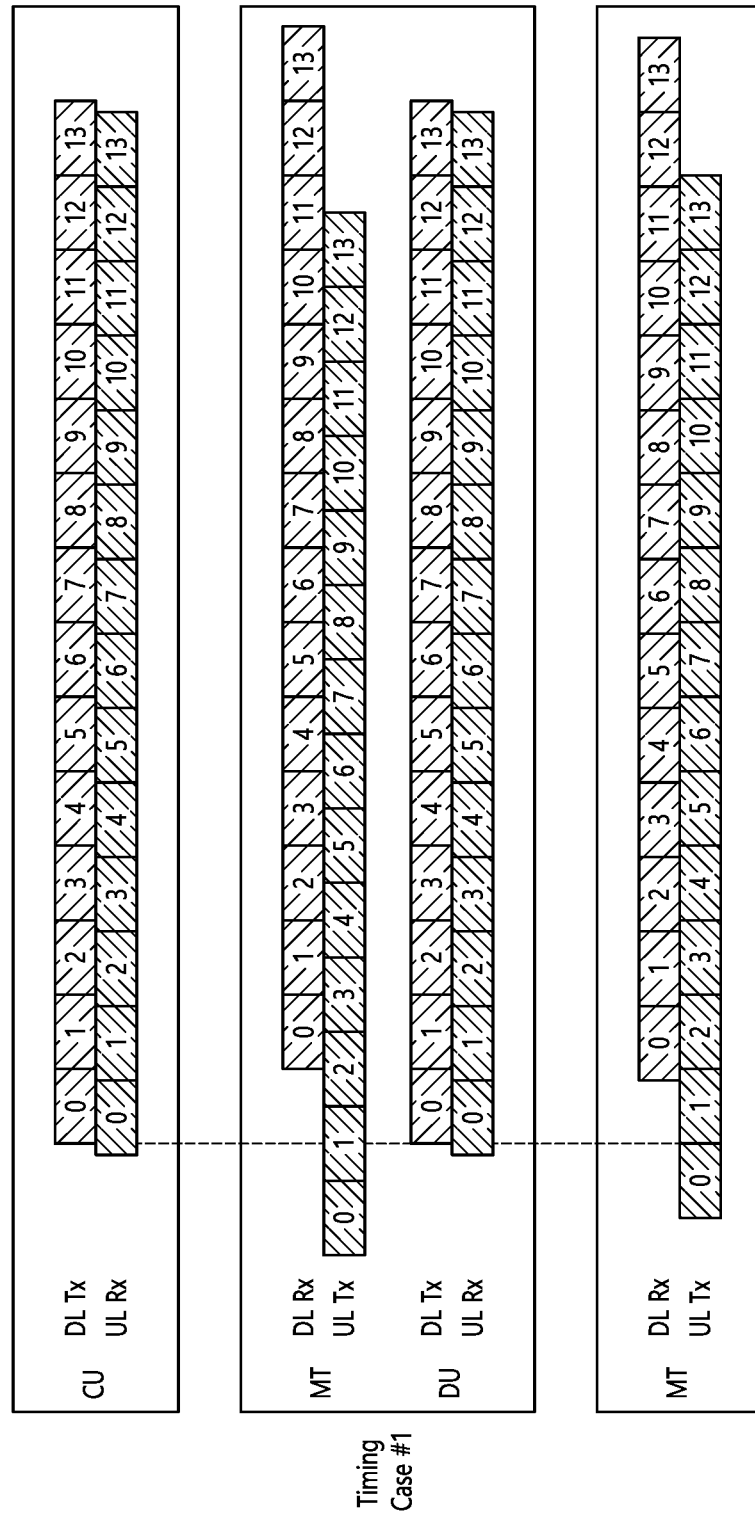
FIG. 16 schematically shows an example of timing alignment case 1.

FIG. 16 schematically shows an example of timing alignment case 1.

Timing Alignment Case 1

DL transmission timing alignment across IAB-node(s) and IAB-donor(s). This is a method in which the DL Tx timing of DUs between IAB nodes is aligned, and is a timing alignment method used by Rel-16 IAB nodes.

If DL TX and UL RX are not well aligned at the parent node, additional information about the alignment is needed for the child node to properly set its DL TX timing for OTA based timing & synchronization.

MT Tx timing may be expressed as MT Rx timing−TA, the DU Tx timing may be expressed as MT Rx timing−TA/2−T_delta. The T_delta value is a value obtained from the parent node.

Figure 17:
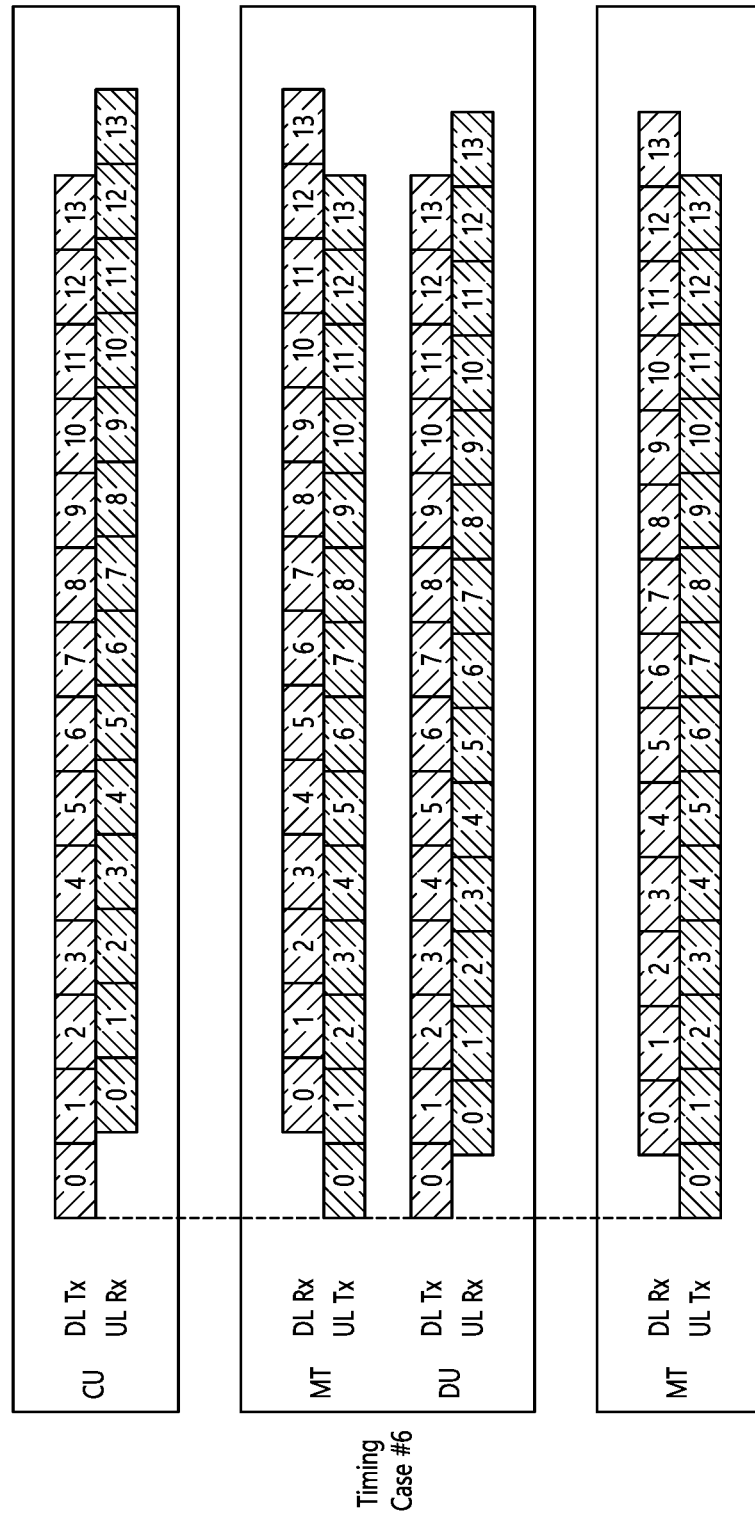
FIG. 17 schematically shows an example of timing alignment case 6.

FIG. 17 schematically shows an example of timing alignment case 6.

Timing Alignment Case 6

The DL transmission timing for all IAB-nodes is aligned with the parent IAB-node or donor DL timing. The UL transmission timing of an IAB-node can be aligned with the IAB-node's DL transmission timing.

This is a method in which the MT UL Tx timing and the DU DL Tx timing of the IAB node are aligned.

Since the UL Tx timing of the MT is fixed, the UL Rx timing of the parent DU receiving it is delayed by the propagation delay of the parent DU and the MT compared to the UL Tx timing of the MT. The UL Rx timing of the MT varies according to the child MT that transmits the UL. When the IAB node uses the timing alignment case 6, since the UL Rx timing of the parent node is different from the existing one, if the IAB node wants to use the timing alignment case 6, the parent node also needs to know the corresponding information.

Figure 18:
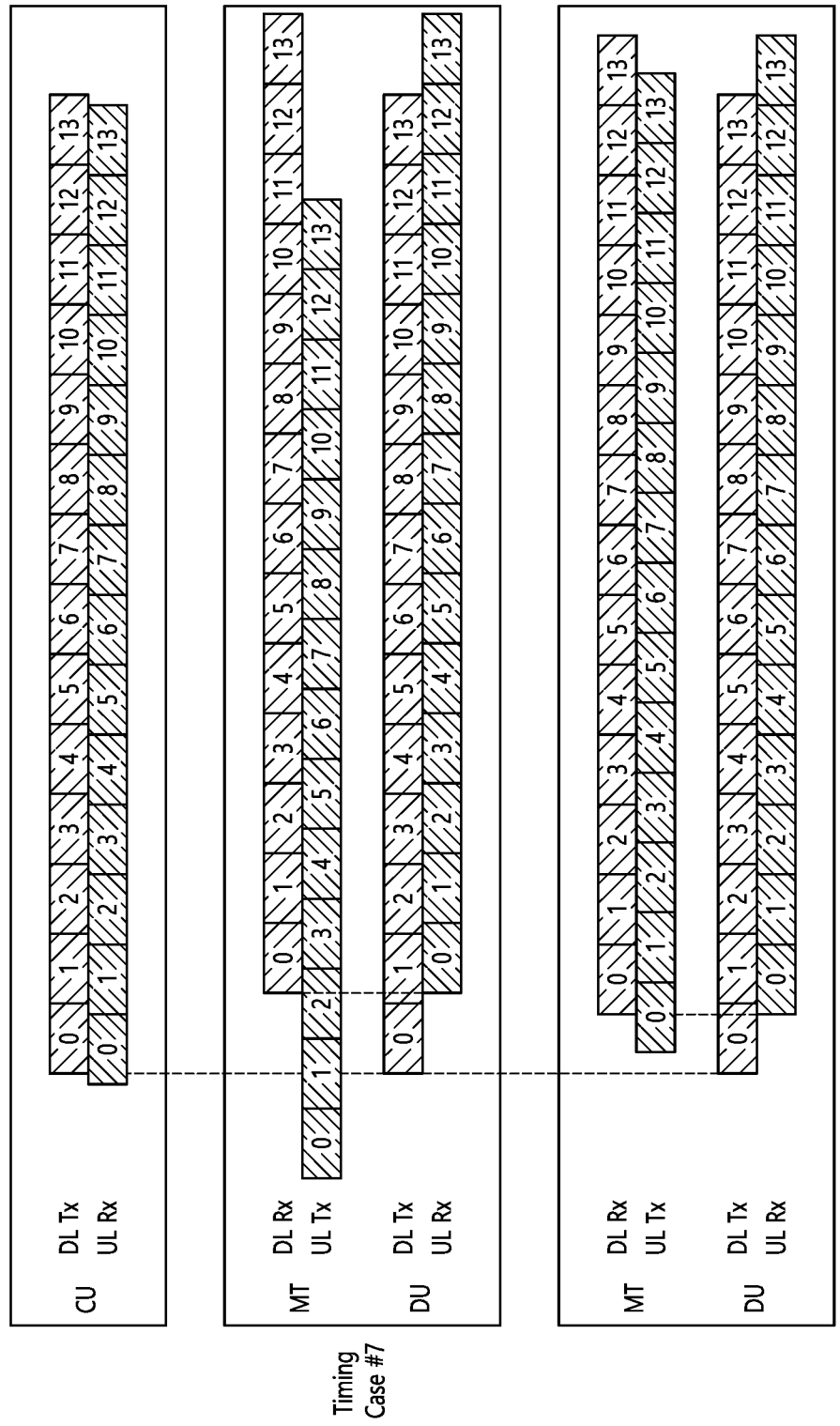
FIG. 18 schematically shows an example of the timing alignment case 7.

FIG. 18 schematically shows an example of the timing alignment case 7.

Timing Alignment Case 7

The DL transmission timing for all IAB-nodes is aligned with the parent IAB-node or donor DL timing. The UL reception timing of an IAB-node can be aligned with the IAB-node's DL reception timing.

If DL TX and UL RX are not well aligned at the parent node, additional information about the alignment is needed for the child node to properly set its DL TX timing for OTA based timing & synchronization.

This is a method in which the MT DL Rx timing and the DU UL Rx timing of the IAB node are aligned.

The transmission/reception timing from the MT perspective is the same as that of the existing IAB node (Rel-16 IAB node), the UL Rx timing of the DU may be aligned with the DL Rx timing of the MT. The IAB node needs to adjust the TA of the child MTs so that the child MTs transmit UL signals according to their UL Rx timing.

Therefore, this timing alignment method may not reveal a difference in the specification operation of the IAB node compared to the existing timing alignment method (case 1). Accordingly, the timing alignment case 7 described herein may be replaced/interpreted as the timing alignment case 1.

Timing alignment in this specification may mean slot-level alignment or symbol-level alignment. In this case, the timing alignment may mean a timing alignment between the UL Tx of the MT and the DL Tx of the DU, and/or between the DL Rx of the MT and the UL Rx of the DU. In this case, more specifically, timing alignment may be performed as follows.

Alt 1. Timing alignment between the MT UL and the DU DL may be performed for a time period in which the MT and the DU actually perform the Tx operation. And/or, timing alignment between the MT DL and the DU UL may be performed for a time interval in which the MT and the DU perform the Rx operation.

Alt 2. Characteristically, by the resource (resource) direction information configured with RRC/F1-AP, etc., Alignment of the Tx timing between the UL resource of the MT and the DL resource of the DU may be made.

And/or alignment of the Rx timing between the DL resource of the MT and the UL resource of the DU may be made.

And/or, timing alignment between the flexible resource of the MT and the flexible resource of the DU may be performed.

The following will be described based on the case where the MT is configured with a single CC and the DU is configured with a single cell. The contents of the present specification may be extended and applied when the MT is configured with multiple CCs. In this case, MT and DU may be interpreted as MT CC and DU cells, respectively.

A. How to Divide the Multiplexing Type

The following method may be considered as a method of indicating a multiplexing method between an MT and a DU of an IAB node. In this specification, no-TDM means an operation in which TDM is not performed, which may be replaced/interpreted as an SDM, FDM, FD operation, or the like.

1. Alt 1. Indicate TDM/No-TDM According to the Tx/Rx Direction Combination of MT and DU for Each MT CC/DU Cell Pair.

A multiplexing scheme of TDM or no-TDM may be provided according to the combination of the Tx/Rx directions of the MT and the DU. That is, each of the four combinations of MT Tx/DU Tx, MT Tx/DU Rx, MT Rx/DU Tx, and MT Rx/DU Rx may have a TDM or no-TDM multiplexing scheme. In this case, the TDM multiplexing method may be used as a default, and the no-TDM multiplexing method may be provided when a separate configuration or request is made.

2. Alt 2. Indicate TDM/No-TDM Combination of MT and DU for Each MT CC/DU Cell Pair Whether or not TDM/no-TDM according to the Tx/Rx direction combination between the MT and the DU is defined as several sets, and one multiplexing scheme among the corresponding sets may be provided. This TDM/no-TDM combination may include all or part of the following.

(1) TDM/No-TDM Combination 1: TDM

Considering the TDM operation between the DU and the MT, TDM/no-TDM combination 1 may operate as TDM for all combinations of the Tx/Rx directions of the DU and the MT. That is, TDM is applied to each combination of the transmission/reception directions of the DU and the MT as follows. This TDM/no-TDM combination is called 'TDM' between the DU and the MT for convenience.

MT Tx/DU Tx: TDM
MT Tx/DU Rx: TDM
MT Rx/DU Tx: TDM
MT Rx/DU Rx: TDM

Characteristically, in such a TDM/no-TDM combination, a transmission/reception operation may be smoothly performed even if a setting method of Tx/Rx timing of DU and MT of the IAB node is not defined in a specific manner. In this case, timing alignment case 1, which is characteristically a legacy timing alignment operation, may be applied.

(2) TDM/No-TDM Combination 2: Tx No-TDM

Considering the SDM/FDM operation between the DL of the DU and the UL of the MT, in TDM/no-TDM combination 2, a no-TDM operation may be performed for a combination in which both the DU and the MT have the direction of Tx. In this case, for example, since the DU and the MT operate using the same panel, the DL Tx of the DU and the UL Tx of the MT must match each other to enable simultaneous transmission or reception. In this case, when the DU and the MT transmit at the same time, the operation may be performed without performing TDM (i.e., no-TDM). In this case, when both the DU and the MT perform the Rx operation, SDM/FDM may not be performed. That is, TDM or no-TDM is applied according to the combination of the transmission/reception directions of the DU and the MT as follows. The corresponding feature to which no-TDM is applied for a combination in which both Tx/Rx directions of DU and MT are Tx is called 'Tx no-TDM' between DU and MT for convenience.

MT Tx/DU Tx: no-TDM
MT Tx/DU Rx: TDM
MT Rx/DU Tx: TDM
MT Rx/DU Rx: TDM

Characteristically, in such a TDM/no-TDM combination, the timing of the DL Tx of the DU and the timing of the UL Tx of the MT in the IAB node should be aligned with each other. Characteristically, timing alignment case 6 may be applied for alignment between the timing of the DL Tx of the DU and the timing of the UL Tx of the MT.

(3) TDM/No-TDM Combination 3: Rx No-TDM

Considering the SDM/FDM operation between the UL of the DU and the DL of the MT, in TDM/no-TDM combination 3, both the DU and the MT may operate as no-TDM for a combination having the Rx direction. In this case, for example, since the DU and the MT operate using the same panel, the UL Rx of the DU and the DL Rx of the MT must match each other to enable simultaneous transmission or reception. In this case, when the DU and the MT simultaneously receive, it may operate without performing TDM (i.e., no-TDM). In this case, when both the DU and the MT perform the Tx operation, SDM/FDM may not be performed. That is, TDM or no-TDM is applied according to the combination of the transmission/reception directions of the DU and the MT as follows. For convenience, the feature to which no-TDM is applied for a combination in which both the Tx/Rx directions of the DU and the MT are Rx is called 'Rx no-TDM' between the DU and the MT.

MT Tx/DU Tx: TDM
MT Tx/DU Rx: TDM
MT Rx/DU Tx: TDM
MT Rx/DU Rx: no-TDM

Characteristically, in this TDM/no-TDM combination, the timing of the UL Rx of the DU and the timing of the DL Rx of the MT in the IAB node should be aligned with each other. Characteristically, timing alignment case 7 may be applied to align the timing of the UL Rx of the DU and the timing of the DL Rx of the MT.

(4) TDM/No-TDM Combination 4: Tx/Rx No-TDM

Considering the SDM/FDM operation between the Tx of the DU and the MT or between the Rx of the DU and the MT, In TDM/no-TDM combination 4, a no-TDM operation may be performed for a combination in which both DU and MT have a direction of Tx and a combination in which both DU and MT have a direction of Rx. That is, TDM or no-TDM is applied according to the combination of the transmission/reception directions of the DU and the MT as follows. The corresponding feature to which no-TDM is applied for a combination in which the Tx/Rx directions of the DU and the MT are both Tx or Rx is called 'Tx/Rx no-TDM' between the DU and the MT for convenience.

MT Tx/DU Tx: no-TDM
MT Tx/DU Rx: TDM
MT Rx/DU Tx: TDM
MT Rx/DU Rx: no-TDM

At this time, characteristically, according to the timing alignment method of the IAB node, the TDM/no-TDM combination 4 may be subdivided into two combinations of 4-1 and 4-2.

TDM/No-TDM Combination 4-1

In the TDM/no-TDM combination 4-1, for example, since the DU and the MT operate using different panels, simultaneous transmission or reception may be possible even if symbol boundaries are shifted from each other. In this case, even if the setting method of the Tx/Rx timing of DU and MT of the IAB node is not defined in a specific way, the transmission/reception operation may be smoothly performed. In this case, characteristically, timing alignment case 1, which is a legacy timing alignment operation, may be applied.

TDM/No-TDM Combination 4-2

In TDM/no-TDM combination 4-1, for example, when the DU and the MT use the same panel, symbol boundaries between Tx of "DU and MT" and Rx of "DU and MT" must match each other to enable simultaneous transmission or reception. In this case, "the timing of the UL Rx of the DU and the timing of the DL Rx of the MT" in the IAB node should be aligned with each other. Characteristically, timing alignment case 7 may be applied to a resource in which the UL Rx of the DU and/or the DL Rx of the MT operates for alignment between the timing of the UL Rx of the DU and the timing of the DL Rx of the MT. In addition, timing alignment case 6 may be applied to a resource in which the DL Tx of the DU and/or the UL Tx of the MT operate.

(5) TDM/No-TDM Combination 5: No-TDM

In consideration of the full duplexing operation between the DU and the MT, in TDM/no-TDM combination 1, no-TDM may be operated for all combinations of the Tx/Rx directions of the DU and the MT. That is, no-TDM is applied to each combination of the transmission/reception directions of the DU and the MT as follows. This TDM/no-TDM combination is called 'no-TDM' between the DU and the MT for convenience.

MT Tx/DU Tx: no-TDM
MT Tx/DU Rx: no-TDM
MT Rx/DU Tx: no-TDM
MT Rx/DU Rx: no-TDM

Characteristically, in such a TDM/no-TDM combination, transmission/reception operation may be smoothly performed even if the setting method of the Tx/Rx timing of DU and MT of the IAB node is not defined in a specific way. In this case, characteristically, timing alignment case 1, which is a legacy timing alignment operation, may be applied.

B. How to Divide the Timing Alignment Scheme

The following method may be considered as a method for indicating a method of matching the Tx/Rx timing of MT and DU of the IAB node.

1. Alt 1. Tx/Rx Timing Method of MT and DU is Notified at Once

The Tx/Rx timing alignment method of the MT and DU of the IAB node may be informed at once. In this case, the IAB node (at a specific point in time) may have, for example, one of the following timing alignment cases.

Timing Alignment Case 1
Timing Alignment Case 6
Timing Alignment Case 7

2. Alt 2. Independently Informs MT's Tx/Rx Timing Method and DU's Tx/Rx Timing Method In the IAB node, MT's Tx/Rx timing alignment method and DU's Tx/Rx timing alignment method may be independently informed.

The MT (at a specific point in time) may have, for example, one of the following timing alignment cases.

MT Timing Alignment Case 1

The reception timing of the DL signal of the parent DU becomes the Rx timing of the MT.

The Tx timing of the MT is a timing that is changed (forwarded or pushed back) by the TA value from the Rx timing of the MT.

This is an MT timing alignment method corresponding to the MT Tx/Rx timing in the timing alignment cases 1 or 7.

MT Timing Alignment Case 2

The reception timing of the DL signal of the parent DU becomes the Rx timing of the MT.

The MT sets the Tx timing of the MT to be the same as the DL Tx timing of the DU of the same IAB node. Alternatively, the Tx timing of the MT is a timing obtained by changing (advancing) the TA value from the Rx timing of the MT, the TA value is set from the parent node so that the Tx timing of the MT is the same as the DL Tx timing of the DU.

This is an MT timing alignment method corresponding to the MT Tx/Rx timing in the timing alignment case 6.

A DU (at a specific point in time) may have, for example, one of the following timing alignment cases.

DU Timing Alignment Case 1

In order to align the DL Tx timing of the DU between IAB nodes, the Tx timing of the DU may be expressed as MT Rx timing−TA/2−T_delta. The T_delta value is a value obtained from the parent node.

The Rx timing of the DU is advanced or pushed back by an offset value from the Tx timing of the DU. This offset value may be 1) defined in the specification, 2) fixed to a specific value by implementation, or 3) implicitly determined and set by the IAB node.

This is a DU timing alignment method corresponding to DU Tx/Rx timing in timing alignment cases 1, 6, or 7.

DU Timing Alignment Case 2

The DU Tx timing may be expressed as MT Rx timing−TA/2−T_delta so that the DL Tx timing of the DUs between IAB nodes can be aligned. The T_delta value is a value obtained from the parent node.

The Rx timing of the DU is set to be the same as the DL Rx timing of the MT. That is, the Rx timing of the DU is advanced or pushed back by the offset value from the Tx timing of the DU, at this time, the offset value is determined to be the same as the DL Rx timing of the MT.

This is the DU timing alignment method corresponding to the DU Tx/Rx timing in the timing alignment case 7.

DU Timing Alignment Case 3

In order to align the DL Tx timing of the DUs between IAB nodes, the DU Tx timing may be expressed as MT Rx timing−TA/2−T_delta. The T_delta value is a value obtained from the parent node.

The timing of receiving the UL Tx timing of the child MT may be the same as the Rx timing of the DU. To this end, the Rx timing of the DU is advanced or pushed back by the offset value from the Tx timing of the DU. In this case, a propagation delay value with a child MT transmitting UL or a TA value applied to a child MT transmitting UL is determined as an offset value.

This is a DU timing alignment method corresponding to the DU Tx/Rx timing in the timing alignment case 6.

3. Alt 3. Indicate Whether the Timing Between DU and MT is Aligned.

It may indicate whether timing is aligned between the DU and the MT in the IAB node.

When the timing between the DU and the MT is not aligned, it means that the timing between the Tx and the Rx of DU and the MT is not aligned. This may mean that timing alignment case 1 is applied. When the timing alignment method of MT and DU is independently configured, it may mean that MT timing alignment case 1 and DU timing alignment case 1 are applied to MT and DU, respectively.

The alignment of the timing between the DU and the MT means that the timing between the Tx of DU and MT is aligned and/or the timing between the Rx of DU and MT is aligned. This may be applied to a case where symbol and/or slot boundaries must match when performing SDM/FDM operation between DU and MT.

At this time, characteristically, when the multiplexing scheme of Rx of DU and Rx of MT is no-TDM, timing alignment between DU and MT may mean that timing alignment case 6 is used. When the MT and DU timing alignment methods are independently configured, it may mean that the MT timing alignment case 2 and the DU timing alignment case 3 are applied to the MT and the DU, respectively.

Or, characteristically, when the multiplexing scheme of Tx of DU and Tx of MT is no-TDM, timing alignment between DU and MT may mean that timing alignment case 7 is used. When the timing alignment methods of the MT and the DU are independently configured, it may mean that the MT timing alignment case 1 and the DU timing alignment case 2 are applied to the MT and the DU, respectively. Since the UL Rx timing of the DU is a value that the DU needs to set arbitrarily, DU timing case 2 may not be defined. In this case, it may be determined that the MT timing alignment case 1 and the DU timing alignment case 1 are applied to the MT and the DU, respectively.

Or, characteristically, when the multiplexing method of Tx of DU and Tx of MT and the multiplexing method of Rx of DU and Rx of MT are all no-TDM, timing alignment case 7 may be applied to a resource in which the UL Rx of the DU and/or the DL Rx of the MT operates and timing alignment case 6 may be applied to a resource in which the DL Tx of the DU and/or the UL Tx of the MT operate. When the timing alignment methods of the MT and the DU are independently configured, it may be determined that the MT timing alignment case 1 and the DU timing alignment case 2 are applied to the MT and the DU, respectively. Since the UL Rx timing of the DU is a value that the DU needs to set arbitrarily, DU timing case 2 may not be defined. In this case, it may be determined that the MT timing alignment case 1 and the DU timing alignment case 1 are applied to the MT and the DU, respectively.

4. Alt 4. Determined According to TDM/No-TDM Combination Between MT and DU

According to the multiplexing method between the DU and the MT, it may be determined whether the timing between the DU and the MT in the IAB node is aligned. The timing alignment case may be implicitly determined according to an applied method among the TDM/no-TDM combinations defined in Alt 2 of the section 'A. Method for dividing multiplexing types'. At this time, it may be determined that the following timing alignment method is applied according to the TDM/no-TDM combination.

TDM/No-TDM Combination 1: TDM

In this case, it may be determined that the timing alignment case 1 is applied. When the timing alignment methods of the MT and the DU are independently configured, it may be determined that the MT timing alignment case 1 and the DU timing alignment case 1 are applied to the MT and the DU, respectively.

TDM/No-TDM Combination 2: Tx No-TDM

In this case, it may be determined that the timing alignment case 6 is applied. When the timing alignment methods of the MT and the DU are independently configured, it may be determined that the MT timing alignment case 2 and the DU timing alignment case 3 are applied to the MT and the DU, respectively.

TDM/No-TDM Combination 3: Rx No-TDM

In this case, it may be determined that the timing alignment case 7 is applied. When the timing alignment methods of the MT and the DU are independently configured, it may be determined that the MT timing alignment case 1 and the DU timing alignment case 2 are applied to the MT and the DU, respectively. Since the UL Rx timing of the DU is a value that the DU needs to set arbitrarily, DU timing case 2 may not be defined. In this case, it may be determined that the MT timing alignment case 1 and the DU timing alignment case 1 are applied to the MT and the DU, respectively.

TDM/No-TDM Combination 4-1: Tx/Rx No-TDM without Symbol Boundary Alignment

In this case, it may be determined that the timing alignment case 1 is applied. When the timing alignment methods of the MT and the DU are independently configured, it may be determined that the MT timing alignment case 1 and the DU timing alignment case 1 are applied to the MT and the DU, respectively.

TDM/No-TDM Combination 4-2: Tx/Rx No-TDM with Symbol Boundary Alignment

In this case, it may be determined that the timing alignment case 6 is applied in the section in which the DU and/or MT performs the Tx operation. When the timing alignment methods of the MT and the DU are independently configured, it may be determined that the MT timing alignment case 2 and the DU timing alignment case 3 are applied to the MT and the DU, respectively.

It may be determined that the timing alignment case 7 is applied in the section in which the DU and/or MT performs the Rx operation. When the timing alignment methods of the MT and the DU are independently configured, it may be determined that the MT timing alignment case 1 and the DU timing alignment case 2 are applied to the MT and the DU, respectively. Since the UL Rx timing of the DU is a value that the DU needs to set arbitrarily, DU timing case 2 may not be defined. In this case, it may be determined that the MT timing alignment case 1 and the DU timing alignment case 1 are applied to the MT and the DU, respectively.

TDM/No-TDM Combination 5: No-TDM

In this case, it may be determined that the timing alignment case 1 is applied. When the timing alignment methods of the MT and the DU are independently configured, it may be determined that the MT timing alignment case 1 and the DU timing alignment case 1 are applied to the MT and the DU, respectively.

C. Signaling Detail(s) for Multiplexing Scheme and Timing Alignment

Information exchange with a parent node may be required to determine a multiplexing method and a timing alignment method between the DU and the MT of the IAB node. When the multiplexing type between the DU and the MT applied by the IAB node and the multiplexing type of the IAB node understood by the parent node are the same, smooth data transmission/reception can be performed between the parent node and the IAB node. In addition, the Tx/Rx timing of the IAB node assumed by the IAB node and the parent node must be the same for smooth data transmission and reception. To this end, in this specification, it is proposed that the following signaling is transmitted between the IAB node and the parent node. Only some of the signaling suggested below may be supported.

Hereinafter, a parent node may be interpreted to mean a CU or a network as well as a parent node. That is, in the following description, that the IAB node informs the parent node may include that the IAB node informs the CU or the network. That the parent node configures the IAB node may include configuring the CU or the network to the IAB node.

Hereinafter, for a better understanding of the examples of the present specification, the disclosure of the present specification will be described with reference to the drawings. The following drawings were created to explain a specific example of the present specification. Since the names of specific devices described in the drawings or the names of specific signals/messages/fields are presented by way of example, the technical features of the present specification are not limited to the specific names used in the following drawings.

Figure 19:
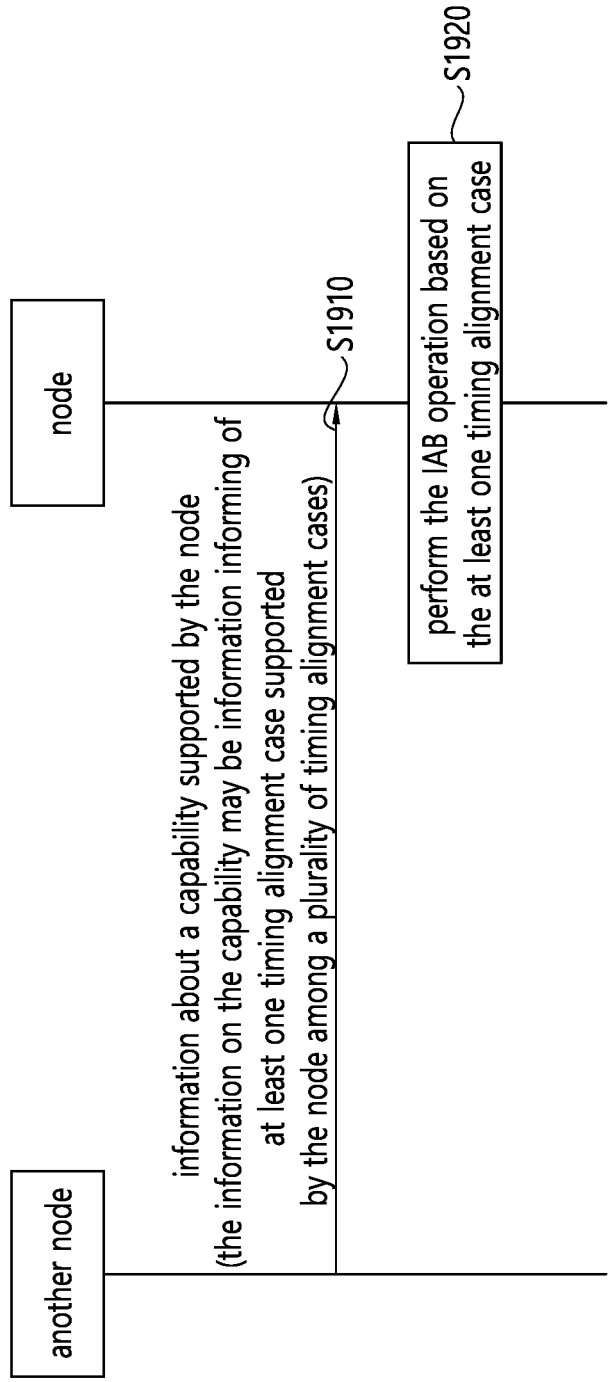
FIG. 19 is a flowchart of a method for transmitting information about capabilities, according to an embodiment of the present specification.

FIG. 19 is a flowchart of a method for transmitting information about capabilities, according to an embodiment of the present specification.

Referring to FIG. 19, a node may transmit information about a capability supported by the node to the other node (S1910). Here, the information on the capability may be information informing of at least one timing alignment case supported by the node among a plurality of timing alignment cases. In this regard, a more specific embodiment is the same as described above (and will be described later), so for convenience of description, repeated description of overlapping content will be omitted.

The node may perform the IAB operation based on the at least one timing alignment case (S1920). In this regard, a more specific embodiment is the same as described above (and will be described later), so for convenience of description, repeated description of overlapping content will be omitted.

For example, the IAB operation may include a mobile terminal (MT) operation and a distributed unit (DU) operation, the MT operation may be an operation related to communication between the node and the parent node, and the DU operation may be an operation related to communication between the node and a child node or communication between the node and a terminal. In this regard, a more specific embodiment is the same as described above (and will be described later), so for convenience of description, repeated description of overlapping content will be omitted.

For example, when it is desired to use a timing alignment case different from the legacy timing alignment case used by the legacy IAB node, the node may transmit the information about the capability to the other node. Here, for example, the legacy timing alignment case may be a timing alignment case 1 in which downlink transmission timings of the DU operation between the node and the parent node are aligned. In this regard, a more specific embodiment is the same as described above (and will be described later), so for convenience of description, repeated description of overlapping content will be omitted.

For example, the node may receive information about a timing alignment case to be actually applied by the node from the other node. Here, for example, when the node uses a timing alignment case different from the timing alignment case used by the legacy IAB node, the node may receive information about the timing alignment case to be actually applied from the other node. Here, for example, when the node does not receive information about the timing alignment case to be actually applied from the other node, the node may determine the timing alignment case to be applied by the node as the timing alignment case 1 in which downlink transmission timings of the DU operation between the node and the parent node are aligned. In this regard, a more specific embodiment is the same as described above (and will be described later), so for convenience of description, repeated description of overlapping content will be omitted.

For example, the timing alignment case is one of a timing alignment case 1, a timing alignment case 6, or a timing alignment case 7, the timing alignment case 1 is a method in which a downlink transmission timing of the DU operation between the node and the parent node is aligned, the timing alignment case 6 is a method in which the downlink transmission timing of the DU operation between the node and the parent node is aligned and a uplink transmission timing of the MT operation of the node and the downlink transmission timing of the DU operation are aligned, and the timing alignment case 7 is a method in which the downlink transmission timing of the DU operation between the node and the parent node is aligned and a downlink reception timing for the MT operation of the node and a uplink reception timing for the DU operation are aligned. In this regard, a more specific embodiment is the same as described above (and will be described later), so for convenience of description, repeated description of overlapping content will be omitted.

For example, the node may receive information about a timing alignment case supported by the other node from the other node. In this regard, a more specific embodiment is the same as described above (and will be described later), so for convenience of description, repeated description of overlapping content will be omitted.

For example, the node may transmit multiplexing related information supported by the node to the other node. In this regard, a more specific embodiment is the same as described above (and will be described later), so for convenience of description, repeated description of overlapping content will be omitted.

The other node may be a parent node, a donor node, or a centralized unit (CU). Here, the information on the above capability may be transmitted to the parent node or may be transmitted to the donor node or the CU. Meanwhile, when information about capabilities is transmitted to a donor node or a CU, it may be transmitted to the node through a parent node (physically). In addition, information on a timing alignment case to be actually applied may be transmitted from a parent node, a donor node, or a CU. Meanwhile, when information on a timing alignment case to be actually applied is transmitted from a donor node or a CU, it may be transmitted through a parent node.

Hereinafter, embodiments of the present specification will be described in more detail. The components in the present specification below may be separated or combined with each other.

1. Signaling on the Capabilities Supported by the Parent Node

The parent node may inform its child nodes of multiplexing-related information and timing alignment-related information supported by the parent node.

The multiplexing-related information supported by the parent node may be as follows.

The parent node may inform whether no-TDM is supported for each Tx/Rx direction combination of MT and DU. At this time, characteristically, information on a Tx/Rx direction combination supporting no-TDM may be informed. In this case, the Tx/Rx direction combination supporting no-TDM means that both TDM and no-TDM are supported, it means that only TDM is supported for a Tx/Rx direction combination that does not support no-TDM or a Tx/Rx direction combination that does not indicate that no-TDM is supported.

The parent node may inform information of the supported Tx/Rx direction combination among the TDM/no-TDM combinations defined in Alt 2 of the section 'A. Method for dividing multiplexing types'.

The parent node may indicate whether no-TDM is supported between the DU and the MT. In this case, support of the no-TDM operation may mean that the no-TDM operation is supported for a combination of Tx/Rx directions of all MTs and DUs. Or, in the specification, if the no-TDM operation is supported only for some Tx/Rx direction combination (s), it may mean that the no-TDM operation is supported for the Tx/Rx direction combination of all MTs and DUs supported by the specification.

Timing alignment-related information supported by the parent node may be as follows.

The parent node may inform information about a timing alignment case supported by the parent node among a plurality of timing alignment cases. For example, the indices of all timing alignment cases supported by the parent node may be known.

The parent node may inform whether timing alignment cases 6 and/or 7 are supported. In this case, it may be assumed that the timing alignment case 1 is supported by default. Alternatively, the parent node may inform whether the timing alignment case 6 is supported. In this case, it may be assumed that timing alignment cases 1 and/or 7 are supported by default.

The parent node may inform information on cases supported for the MT timing alignment case and the DU timing alignment case defined in Alt 2 of the section B. How to divide the timing alignment scheme'. For example, indexes of all MT timing alignment cases and DU timing alignment cases supported by the parent node may be informed.

The parent node may inform whether MT timing alignment case 2 is supported for the MT timing alignment case. In this case, it may be assumed that MT timing alignment case 1 is supported by default.

For the DU timing alignment case, the parent node may inform whether DU timing alignment cases 2 and/or 3 are supported. In this case, it may be assumed that DU timing alignment case 1 is supported by default. Alternatively, the parent node may inform whether DU timing alignment case 3 is supported. In this case, it may be assumed that DU timing alignment cases 1 and/or 2 are supported by default.

The parent node may implicitly inform the applied timing alignment method by notifying whether the timing alignment between the DU and the MT is performed. If the parent node sets whether to align the timing between the DU and the MT in the IAB node, as in Alt 3 of the section 'A. Method for dividing multiplexing types', a supported timing alignment scheme may be determined according to a multiplexing scheme between a DU and an MT of an IAB node supported by a parent node.

The parent node implicitly informs the supported timing alignment case by notifying the information of the supported TDM/no-TDM combination among the TDM/no-TDM combinations defined in Alt 2 of the section 'A. How to divide the multiplexing type'. At this time, as in Alt 4 of the section 'A. Method of dividing multiplexing types', the timing alignment method applied according to the TDM/no-TDM combination may be determined.

This information may be received by the MT through the RRC, and the MT may deliver it to the DU in the same IAB node. Alternatively, such information may be received by the DU and the MT through the F1-AP and the RRC, respectively. Or, when setting the MT timing alignment case and the DU timing alignment case to the MT and the DU, respectively, information on the MT timing alignment case and the DU timing alignment case may be delivered to the MT and the DU through RRC and F1-AP signaling, respectively.

2. Signaling of Capabilities Supported/Willed to be Used by the IAB Node

The IAB node may inform the parent node of multiplexing-related information and timing alignment-related information that it supports or intends to use.

The multiplexing-related information supported or intended to be used by the IAB node may be as follows. Below, for convenience of description, support or use or request is collectively referred to as support.

IAB node may inform whether no-TDM is supported for each Tx/Rx direction combination of MT and DU. In this case, information on a Tx/Rx direction combination that characteristically supports no-TDM may be informed. In this case, the Tx/Rx direction combination supporting no-TDM means that both TDM and no-TDM are supported, it means that only TDM is supported for a Tx/Rx direction combination that does not support no-TDM or a Tx/Rx direction combination that does not indicate that no-TDM is supported.

The IAB node may inform the parent node of information on the Tx/Rx direction combination that the parent node intends to support among the TDM/no-TDM combinations defined in Alt 2 of the section 'A. Method of dividing multiplexing types'.

Timing alignment case-related information that the IAB node supports or intends to use may be as follows. Below, for convenience of description, support or use or request is collectively referred to as support.

IAB node can inform (request) the timing alignment information that it wants to use to the parent node. In this case, specifically, the following method may be used.

IAB node can inform information about the timing alignment case that it wants to use.

The IAB node may inform information about the MT timing alignment case and/or the DU timing alignment case to be used.

When the IAB node wants to use a timing alignment method that is different from the timing alignment method used by the legacy IAB node, the IAB node may inform (request) the information to use a different timing alignment method to the parent node. In this case, specifically, the following method may be used.

IAB node can inform information about the timing alignment case that it wants to use. In this case, the timing alignment method used by the legacy IAB node may mean the timing alignment case 1. In this case, if the timing alignment case 7 is additionally used, the corresponding timing alignment case may be applied to the IAB node itself without exchanging information with the parent node. Therefore, when the timing alignment case 6 is to be used, this information may be known (requested) to the parent node.

The IAB node may inform information about the MT timing alignment case and/or the DU timing alignment case to be used. The timing alignment method used by the legacy IAB node may mean MT timing alignment case 1 and DU timing alignment case 1. In this case, when DU timing alignment case 2 is used, the corresponding DU timing alignment case may be applied to the IAB node itself without exchanging information with the parent node. Therefore, when DU timing alignment case 3 is to be used, such information may be informed (requested) to the parent node.

The IAB node may inform the parent node of information that timing alignment is required without information on the timing alignment method. In this case, as described in Alt 3 of the section 'A. Method of dividing multiplexing types' above, whether the timing alignment requested by the IAB node is applied and the timing alignment method requested by the IAB node according to the multiplexing method between the DU and the MT requested by the IAB node may be determined.

The timing alignment method that the IAB node intends to apply can be implicitly informed by transmitting multiplexing related information supported or intended for use by the IAB node without separate independent signaling. In this case, among the TDM/no-TDM combinations defined in Alt 2 of the section 'A. Method of dividing multiplexing types', a timing alignment method to be applied may be implicitly informed by notifying information on a Tx/Rx direction combination supported or intended to be used. At this time, as in Alt 4 of the section 'A. Method of dividing multiplexing types', the timing alignment method notified by the IAB node may be determined according to the TDM/no-TDM combination that the IAB node supports or intends to use.

3. Signaling on How Multiplexing and Timing Alignment to be Applied by the IAB Node The IAB node may receive multiplexing-related information and timing alignment-related information to be applied to it from the parent node.

The multiplexing-related information configured by the IAB node may be as follows.

The parent node may inform the IAB node of whether or not no-TDM is applied for each Tx/Rx direction combination of the MT of the IAB and the DU. In this case, information of a Tx/Rx direction combination to which no-TDM is characteristically applied may be informed.

The parent node may inform the IAB node of information on the applied Tx/Rx direction combination among the TDM/no-TDM combinations defined in Alt 2 of the section 'A. Method of dividing multiplexing types'.

The parent node may transmit a signal confirming the multiplexing scheme requested by the IAB node through the 'signaling capability supported/to be used by the IAB node'. When the parent node confirms the multiplexing method requested by the IAB node, the IAB node may operate according to the multiplexing method requested by the IAB node. On the other hand, before or when the parent node does not confirm the multiplexing scheme requested by the IAB node, the IAB node may operate assuming no-TDM for the Tx/Rx direction combination of all MTs and DUs.

Timing alignment-related information set by the IAB node may be as follows.

The parent node may inform the timing alignment information applied to the IAB node. In this case, specifically, the following method may be used.

Information about timing alignment cases applied by the IAB node can be provided.

Information about the MT timing alignment case and/or DU timing alignment case applied by the IAB node may be informed.

The parent node may inform the IAB node of the timing alignment method to be used when the IAB node needs to use a timing alignment method that is different from the timing alignment method used by the legacy IAB node. In this case, specifically, the following method may be used.

IAB node can inform information about timing alignment case to be applied. If there is no such setting, the IAB node may determine the timing alignment method it applies as the timing alignment case 1. In this case, in the case of the additional timing alignment case 7, the IAB node may apply the corresponding timing alignment case by itself. Therefore, this information can be informed when timing alignment case 6 is applied.

Information on the MT timing alignment case and/or DU timing alignment case to be applied by the IAB node may be informed. If there is no such setting, the IAB node may determine that the timing alignment method it applies is the MT timing alignment case 1 and the DU timing alignment case 1. In this case, when the DU timing alignment case 2 is additionally used, the corresponding DU timing alignment case may be applied to the IAB node itself without exchanging information with the parent node. Therefore, this information can be informed when the DU timing alignment case 3 is applied.

The parent node may inform the IAB node of information that the timing alignment is applied without information on the timing alignment method. In this case, as in the method described in Alt 3 of the section 'A. Method of dividing multiplexing types', the timing alignment method to be applied may be determined according to whether or not the timing alignment is applied and the multiplexing method between the DU and the MT applied to the IAB node.

The timing alignment method applied to the IAB node may be implicitly determined according to multiplexing related information applied to itself without independent signaling. In this case, among the TDM/no-TDM combinations defined in Alt 2 of the section 'A. Method of dividing multiplexing types', by receiving the information of the Tx/Rx direction combination applied to the self, it is possible to implicitly determine the timing alignment method applied to the self. At this time, as in Alt 4 of the section 'A. Method of dividing multiplexing types' above, the timing alignment method applied to the IAB node may be determined according to the TDM/no-TDM combination applied to the IAB node.

This information may be received by the MT through the RRC, and the MT may deliver it to the DU in the same IAB node. Alternatively, such information may be received by the DU and the MT through the F1-AP and the RRC, respectively. Or, when setting the MT timing alignment case and the DU timing alignment case to the MT and the DU, respectively, information on the MT timing alignment case and the DU timing alignment case may be delivered to the MT and the DU through RRC and F1-AP signaling, respectively.

According to the embodiment of the present specification described above, when the node performs the IAB operation, it may become clear on which timing alignment case the IAB operation will be performed based on the node, and thus the stability and efficiency of wireless communication may be increased.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

Figure 20:
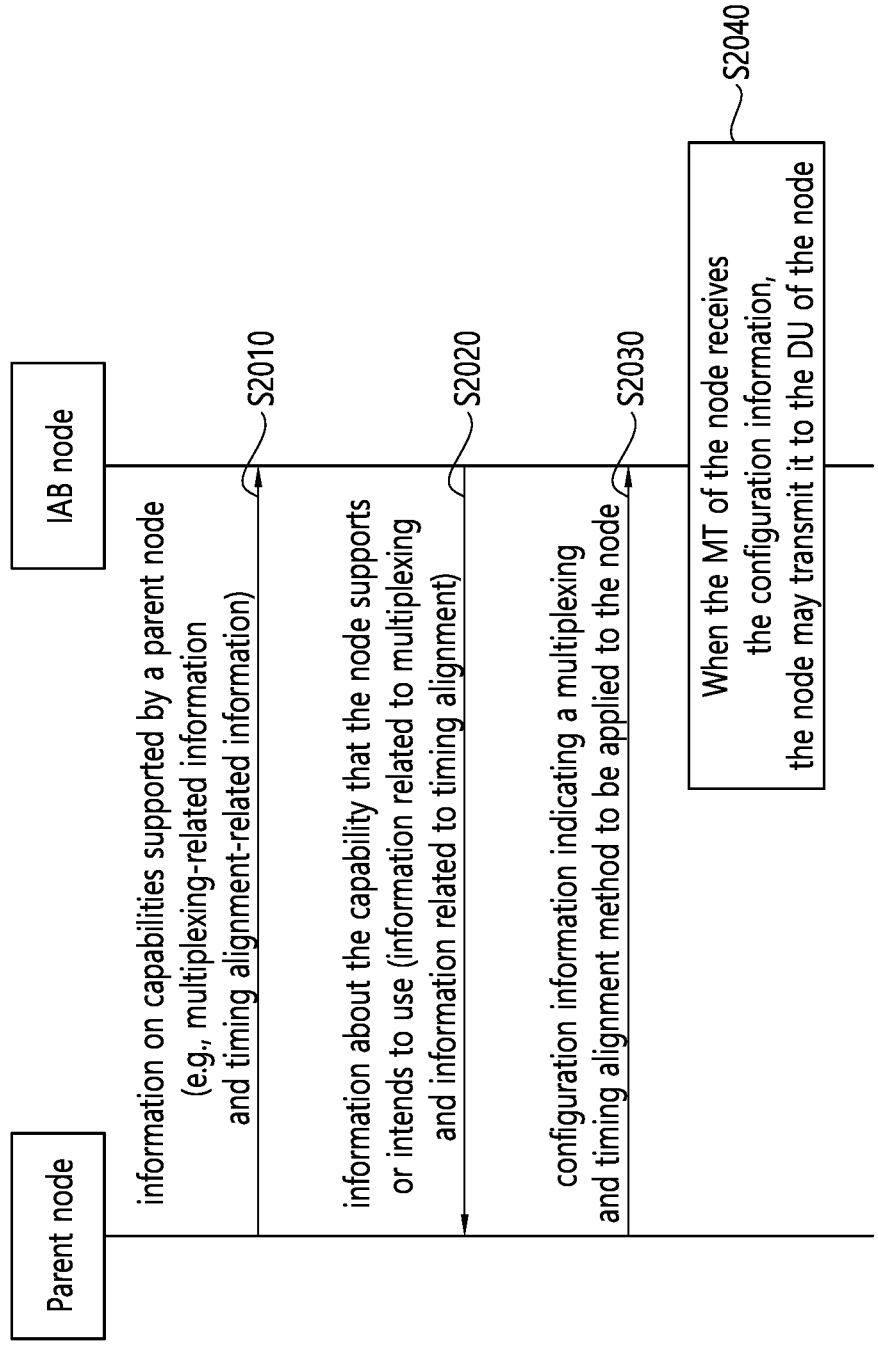
FIG. 20 is a flowchart of a method for transmitting information about capabilities according to another embodiment of the present specification.

FIG. 20 is a flowchart of a method for transmitting information about capabilities according to another embodiment of the present specification.

Referring to FIG. 20, a node may receive information on capabilities supported by a parent node (e.g., multiplexing-related information and timing alignment-related information) (S2010). In this regard, a more specific embodiment is the same as described above (and will be described later), so for convenience of description, repeated description of overlapping content will be omitted.

The node may transmit information about the capability that the node supports or intends to use (information related to multiplexing and information related to timing alignment) (S2020). In this regard, a more specific embodiment is the same as described above (and will be described later), so for convenience of description, repeated description of overlapping content will be omitted.

The node may receive configuration information indicating a multiplexing and timing alignment method to be applied to the node (S2030). In this regard, a more specific embodiment is the same as described above (and will be described later), so for convenience of description, repeated description of overlapping content will be omitted.

When the node receives the configuration information at the MT of the node, the node may transmit it to the DU of the node (S2040). In this regard, a more specific embodiment is the same as described above (and will be described later), so for convenience of description, repeated description of overlapping content will be omitted.

Figure 21:
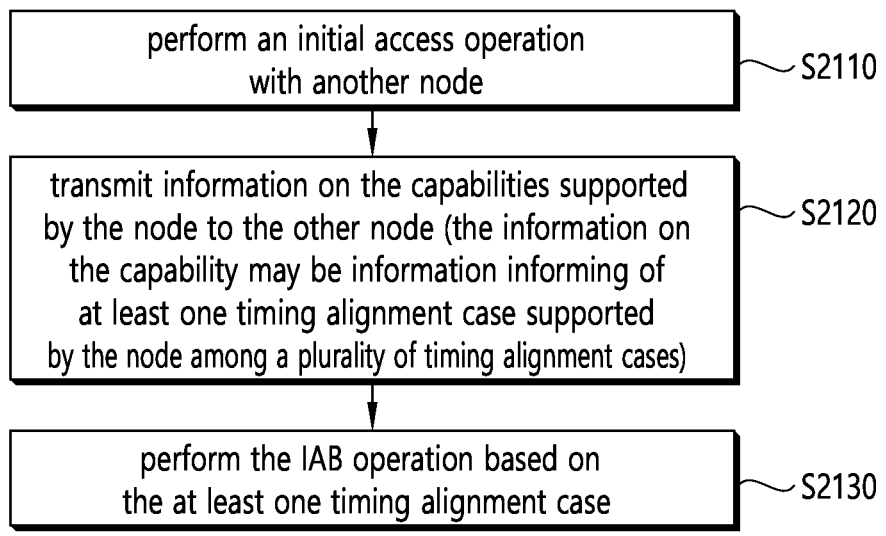
FIG. 21 is a flowchart of a method of transmitting information about a capability according to another embodiment of the present specification.

FIG. 21 is a flowchart of a method of transmitting information about a capability according to another embodiment of the present specification.

According to FIG. 21, an initial access operation with another node may be performed (S2110). In this regard, a more specific embodiment is the same as described above (and will be described later), so for convenience of description, repeated description of overlapping content will be omitted.

Information on the capabilities supported by the node may be transmitted to the other node (S2120). Here, the information on the capability may be information informing of at least one timing alignment case supported by the node among a plurality of timing alignment cases. In this regard, a more specific embodiment is the same as described above (and will be described later), so for convenience of description, repeated description of overlapping content will be omitted.

The node may perform the IAB operation based on the at least one timing alignment case (S2130). In this regard, a more specific embodiment is the same as described above (and will be described later), so for convenience of description, repeated description of overlapping content will be omitted.

On the other hand, if the contents to which the above-described examples are applied from the viewpoint of various subjects, it may be as follows.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 22:
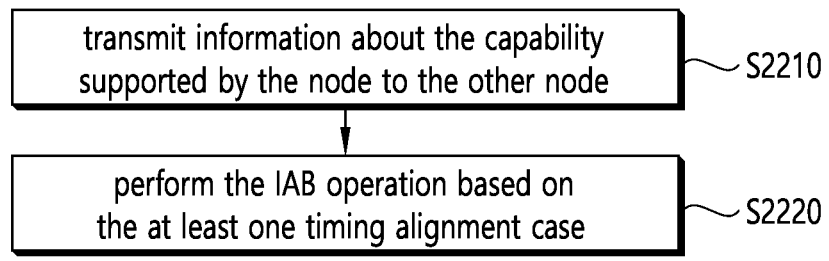
FIG. 22 is a flowchart of a method for transmitting information about capabilities (from a node perspective) according to an embodiment of the present specification.

FIG. 22 is a flowchart of a method for transmitting information about capabilities (from a node perspective) according to an embodiment of the present specification.

The node may transmit information about the capability supported by the node to the other node (S2210). Here, the information on the capability may be information informing of at least one timing alignment case supported by the node among a plurality of timing alignment cases. In this regard, a more specific embodiment is the same as described above (and will be described later), so for convenience of description, repeated description of overlapping content will be omitted.

The node may perform the IAB operation based on the at least one timing alignment case (S2220). In this regard, a more specific embodiment is the same as described above (and will be described later), so for convenience of description, repeated description of overlapping content will be omitted.

Figure 23:
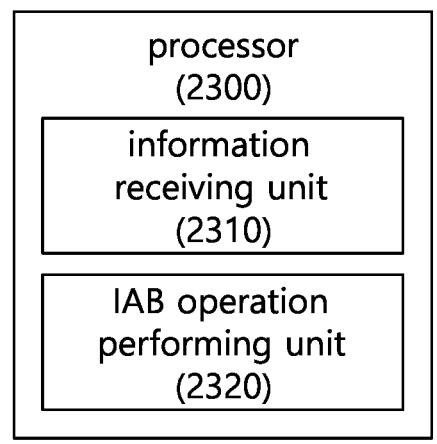
FIG. 23 is a block diagram of an example of an apparatus for transmitting information about capabilities (from a node perspective) according to an embodiment of the present specification.

FIG. 23 is a block diagram of an example of an apparatus for transmitting information about capabilities (from a node perspective) according to an embodiment of the present specification.

Referring to FIG. 23, the processor 2300 may include an information transmission unit 2310 and an IAB operation performing unit 2320. Here, the processor 2300 may correspond to a processor in FIGS. 26 to 32 to be described later.

The information transmission unit 2310 may be configured to control the transceiver to transmit information on the capability supported by the node to the other node. Here, the information on the capability may be information informing of at least one timing alignment case supported by the node among a plurality of timing alignment cases. In this regard, a more specific embodiment is the same as described above (and will be described later), so for convenience of description, repeated description of overlapping content will be omitted.

The IAB operation performing unit 2320 may be configured to perform an Integrated Access and Backhaul (IAB) operation based on the at least one timing alignment case. In this regard, a more specific embodiment is the same as described above (and will be described later), so for convenience of description, repeated description of overlapping content will be omitted.

Although not shown separately, the present specification may also provide the following embodiments.

According to one embodiment, a node may comprise a transceiver, at least one memory and at least one processor operatively coupled with the at least one memory and the transceiver. Here, the at least one processor may be configured to perform an initial access operation with an another node, control the transceiver to transmit, to the another node, information for a capability supported by the node, where the information for the capability is information informing at least one timing alignment case supported by the node among a plurality of timing alignment cases, and perform an Integrated Access and Backhaul (IAB) operation based on the at least one timing alignment case.

According to another embodiment, an apparatus may comprise at least one memory and at least one processor operatively coupled with the at least one memory. Here, the at least one processor may be configured to perform an initial access operation with an another node, control a transceiver to transmit, to the another node, information for a capability supported by the node, where the information for the capability is information informing at least one timing alignment case supported by the node among a plurality of timing alignment cases, and perform an Integrated Access and Backhaul (IAB) operation based on the at least one timing alignment case.

According to another embodiment, at least one computer readable medium including instructions based on being executed by at least one processor is provided. Here, the at least one processor may be configured to perform an initial access operation with an another node, control a transceiver to transmit, to the another node, information for a capability supported by the node, where the information for the capability is information informing at least one timing alignment case supported by the node among a plurality of timing alignment cases, and perform an Integrated Access and Backhaul (IAB) operation based on the at least one timing alignment case.

FIG. 24 is a flowchart of a method of receiving information about capabilities (from the perspective of another node) according to an embodiment of the present specification.

FIG. 24, the node may receive information about the capability supported by the child node from the child node (S2410).

Here, the information on the capability may be information informing of at least one timing alignment case supported by the child node among a plurality of timing alignment cases. In this regard, a more specific embodiment is the same as described above (and will be described later), so for convenience of description, repeated description of overlapping content will be omitted.

Figure 25:
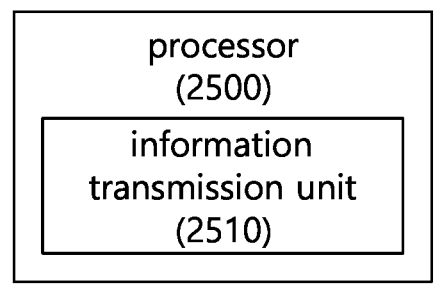
FIG. 25 is a block diagram of an example of an apparatus for receiving information about capabilities (from the perspective of another node) according to an embodiment of the present specification.

FIG. 25 is a block diagram of an example of an apparatus for receiving information about capabilities (from the perspective of another node) according to an embodiment of the present specification.

Referring to FIG. 25, the processor 2500 may include an information receiving unit 2510. Here, the processor 2500 may correspond to a processor in FIGS. 26 to 32 to be described later.

The information receiving unit 2510 may be configured to control the transceiver to receive information about the capability supported by the child node from the child node. Here, the information on the capability may be information informing of at least one timing alignment case supported by the child node among a plurality of timing alignment cases. In this regard, a more specific embodiment is the same as described above (and will be described later), so for convenience of description, repeated description of overlapping content will be omitted.

Figure 26:
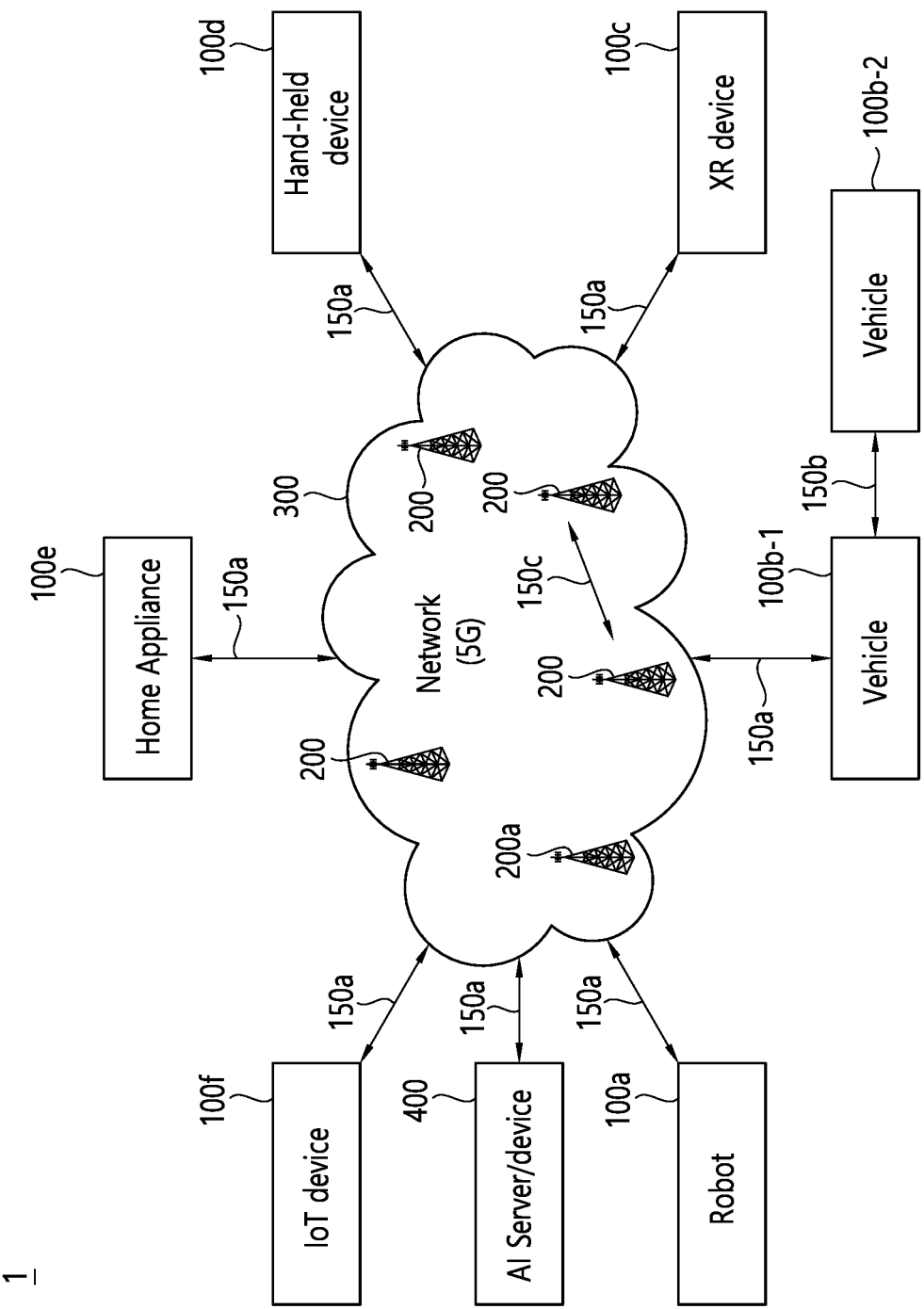
FIG. 26 shows an exemplary communication system (1), according to an embodiment of the present specification.

FIG. 26 shows an exemplary communication system (1), according to an embodiment of the present specification. Referring to FIG. 26, a communication system (1) to which various embodiments of the present specification are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100*a*), vehicles (100*b*-1, 100*b*-2), an eXtended Reality (XR) device (100*c*), a hand-held device (100*d*), a home appliance (100*e*), an Internet of Things (IoT) device (100*f*), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An Artificial Intelligence (AI) technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or D2D communication), or inter BS communication (150c) (e.g., relay, Integrated Access Backhaul (IAB)). The wireless devices and the BSs/the wireless devices may transmit/receive radio signals to/from each other through the wireless communication/connections (150a, 150b, 150c). For example, the wireless communication/connections (150a, 150b, 150c) may transmit/receive signals through various physical channels. For this, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present specification.

Meanwhile, in NR, multiple numerologies (or subcarrier spacing (SCS)) for supporting various 5G services may be supported. For example, in case an SCS is 15 kHz, a wide area of the conventional cellular bands may be supported, and, in case an SCS is 30 kHz/60 kHz dense-urban, lower latency, and wider carrier bandwidth may be supported. In case the SCS is 60 kHz or higher, a bandwidth that is greater than 24.25 GHz may be used in order to overcome phase noise.

An NR frequency band may be defined as two different types of frequency ranges (FR1, FR2). The values of the frequency ranges may be changed (or varied), and, for example, the two different types of frequency ranges (FR1, FR2) may be as shown below in Table 4. Among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 5

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, an example of wireless devices to which the present specification is applied will be described in detail.

Figure 27:
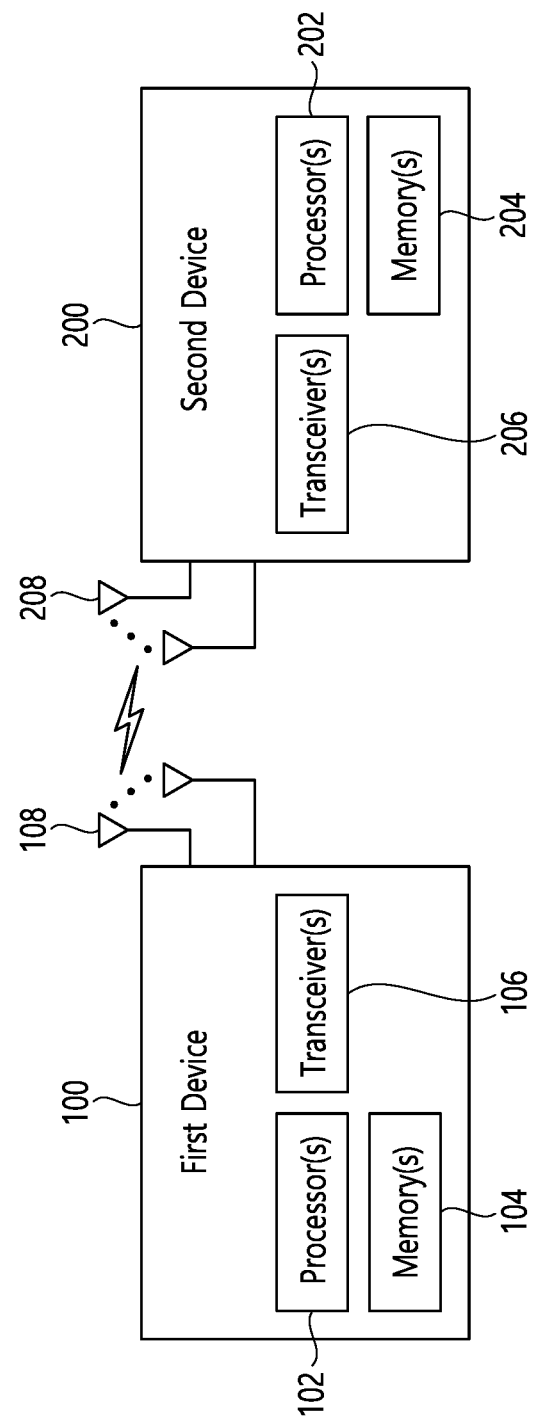
FIG. 27 shows an exemplary wireless device to which the present specification can be applied.

FIG. 27 shows an exemplary wireless device to which the present specification can be applied.

Referring to FIG. 27, a first wireless device (100) and a second wireless device (200) may transmit radio signals through a variety of RATs (e.g., LTE, NR). Herein, {the first wireless device (100) and the second wireless device (200)} may correspond to {the wireless device (100x) and the BS (200)} and/or {the wireless device (100x) and the wireless device (100x)} of FIG. 26.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including instructions for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present specification, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including instructions for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF transceiver(s). In the present specification, the wireless device may represent a communication modem/circuit/chip.

Hereinafter, hardware elements of the wireless devices (100, 200) will be described in more detail. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, instructions, and/or a set of instructions.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. For this, the one or more transceivers (106, 206) may include (analog) oscillators and/or filters.

Figure 28:
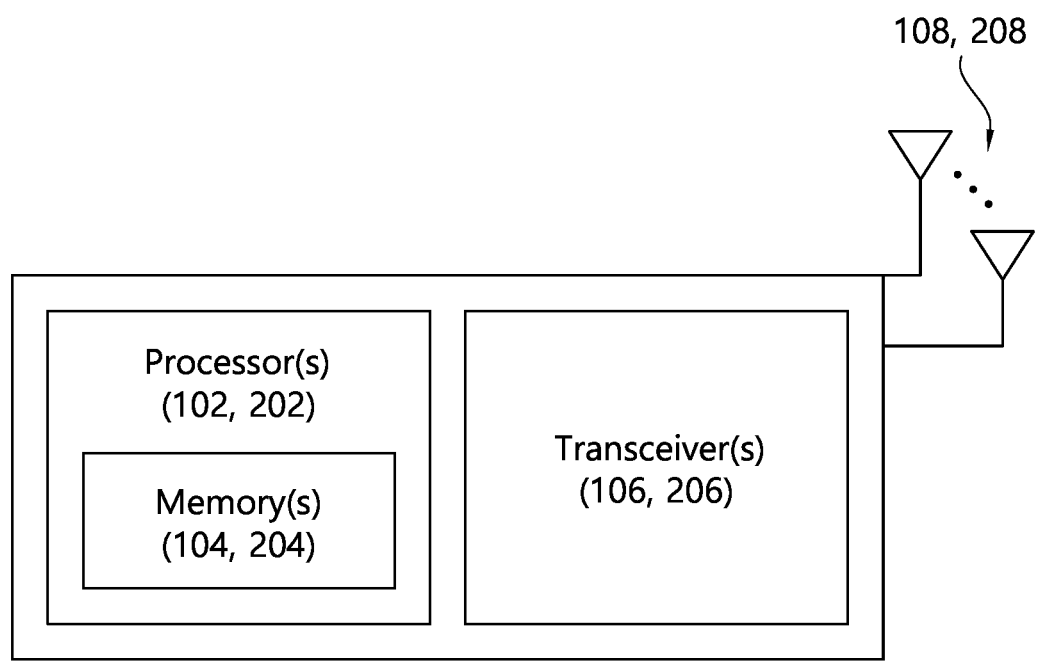
FIG. 28 shows another example of a wireless device applicable to the present specification.

FIG. 28 shows another example of a wireless device applicable to the present specification.

According to FIG. 28, the wireless device may include at least one processor (102, 202), at least one memory (104, 204), at least one transceiver (106, 206), and/or one or more antennas (108, 208).

As a difference between the example of the wireless device described above in FIG. 27 and the example of the wireless device in FIG. 28, in FIG. 27, the processors 102 and 202 and the memories 104 and 204 are separated, but in the example of FIG. 28, the memories 104 and 204 are included in the processors 102 and 202.

Here, a detailed description of the processors 102 and 202, the memories 104 and 204, the transceivers 106 and 206, and the one or more antennas 108 and 208 is as described above, in order to avoid unnecessary repetition of description, description of repeated description will be omitted.

Hereinafter, an example of a signal processing circuit to which the present specification is applied will be described in detail.

Figure 29:
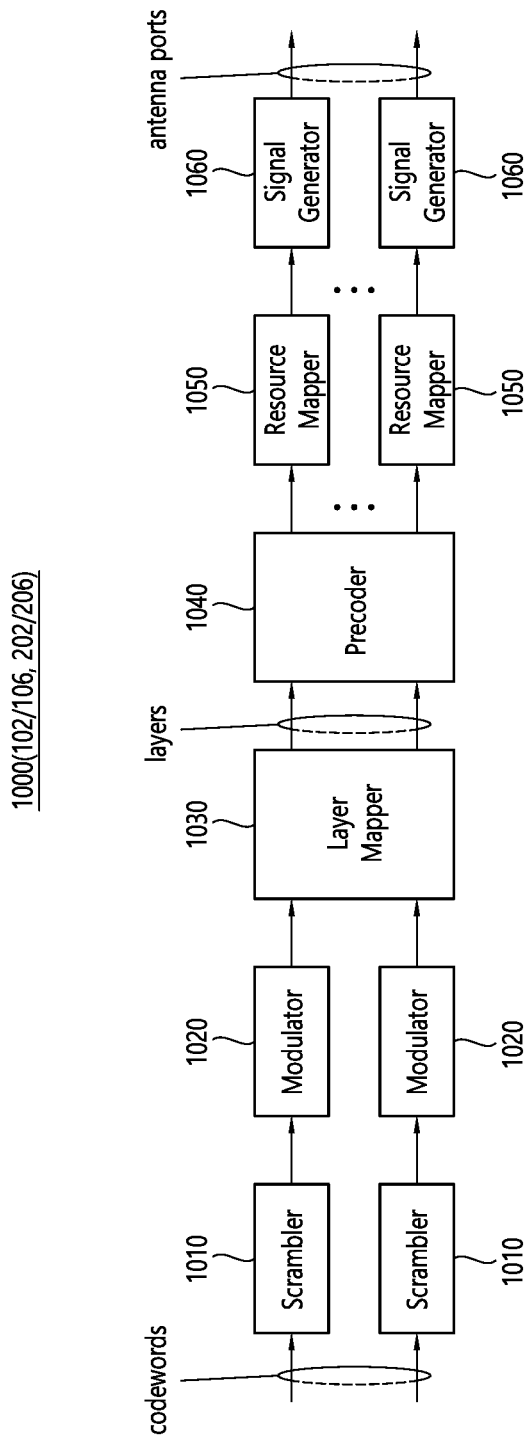
FIG. 29 shows a signal process circuit for a transmission signal according to an embodiment of the present specification.

FIG. 29 shows a signal process circuit for a transmission signal according to an embodiment of the present specification.

Referring to FIG. 29, a signal processing circuit (1000) may include scramblers (1010), modulators (1020), a layer mapper (1030), a precoder (1040), resource mappers (1050), and signal generators (1060). An operation/function of FIG. 29 may be performed, without being limited to, the processors (102, 202) and/or the transceivers (106, 206) of FIG. 27. Hardware elements of FIG. 29 may be implemented by the processors (102, 202) and/or the transceivers (106, 206) of FIG. 27. For example, blocks 1010-1060 may be implemented by the processors (102, 202) of FIG. 27. Alternatively, the blocks 1010-1050 may be implemented by the processors (102, 202) of FIG. 27 and the block 1060 may be implemented by the transceivers (106, 206) of FIG. 27.

Codewords may be converted into radio signals via the signal processing circuit (1000) of FIG. 29. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

More specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports, and M is the number of transport layers. The precoder (1040) may perform precoding after performing transform precoding (e.g., DFT) for complex modulation symbols. Additionally, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), frequency uplink converters, and so on.

Signal processing procedures for a signal received in the wireless device may be configured in a reverse manner of the signal processing procedures (1010~1060) of FIG. 29. For example, the wireless devices (e.g., 100, 200 of FIG. 27) may receive radio signals from the exterior through the antenna ports/transceivers. The received radio signals may be converted into baseband signals through signal restorers. For this, the signal restorers may include frequency downlink converters, Analog-to-Digital Converters (ADCs), CP remover, and Fast Fourier Transform (FFT) modules. Subsequently, the baseband signals may be restored to codewords through a resource demapping procedure, a postcoding procedure, a demodulation processor, and a descrambling procedure. The codewords may be restored to original information blocks through decoding. Therefore, a signal processing circuit (not shown) for a reception signal may include signal restorers, resource demappers, a postcoder, demodulators, descramblers, and decoders.

Hereinafter, a usage example of the wireless to which the present specification is applied will be described in detail.

Figure 30:
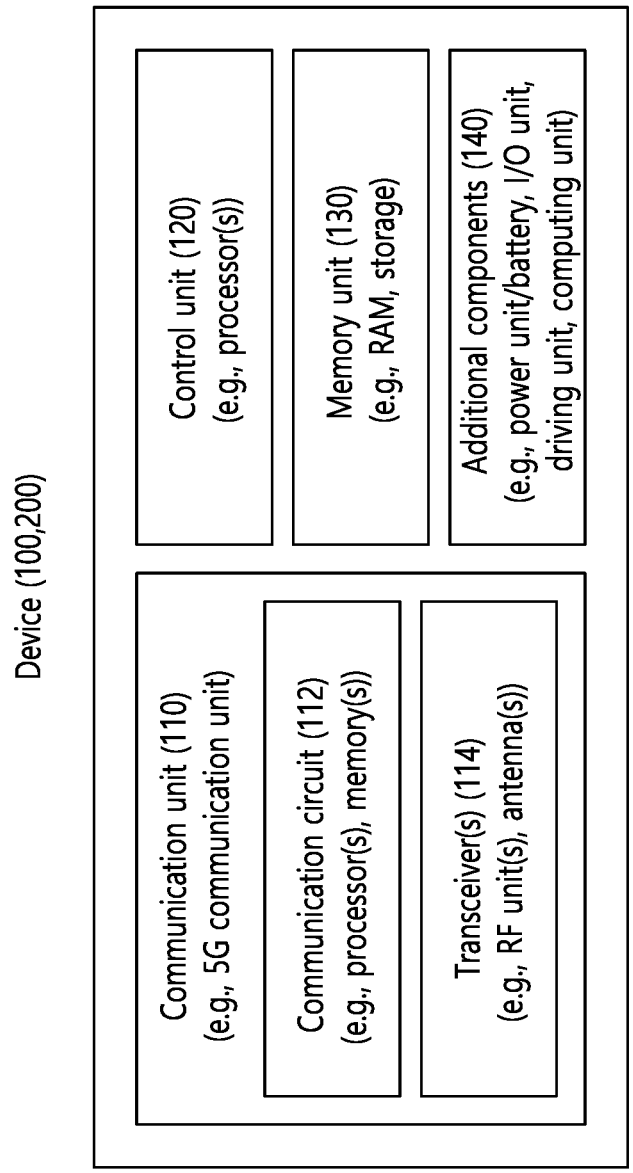
FIG. 30 shows another example of a wireless device according to an embodiment of the present specification.

FIG. 30 shows another example of a wireless device according to an embodiment of the present specification. The wireless device may be implemented in various forms according to a use-case/service (refer to FIG. 26).

Referring to FIG. 30, wireless devices (100, 200) may correspond to the wireless devices (100, 200) of FIG. 27 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 27. For example, the transceiver(s) (114) may include the one or more transceivers (106, 206) and/or the one or more antennas (108, 208) of FIG. 27. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 26), the vehicles (100b-1, 100b-2 of FIG. 26), the XR device (100c of FIG. 26), the hand-held device (100d of FIG. 26), the home appliance (100e of FIG. 26), the IoT device (100f of FIG. 26), a digital broadcast terminal, a hologram device, a public safety device, an MTC device, a medicine device, a fintech device (or a finance device), a security device, a climate/environment device, the AI server/device (400 of FIG. 26), the BSs (200 of FIG. 26), a network node, and so on. The wireless device may be used in a mobile or fixed place according to a usage-example/service.

In FIG. 30, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 30 will be described in detail with reference to the drawings.

Figure 31:
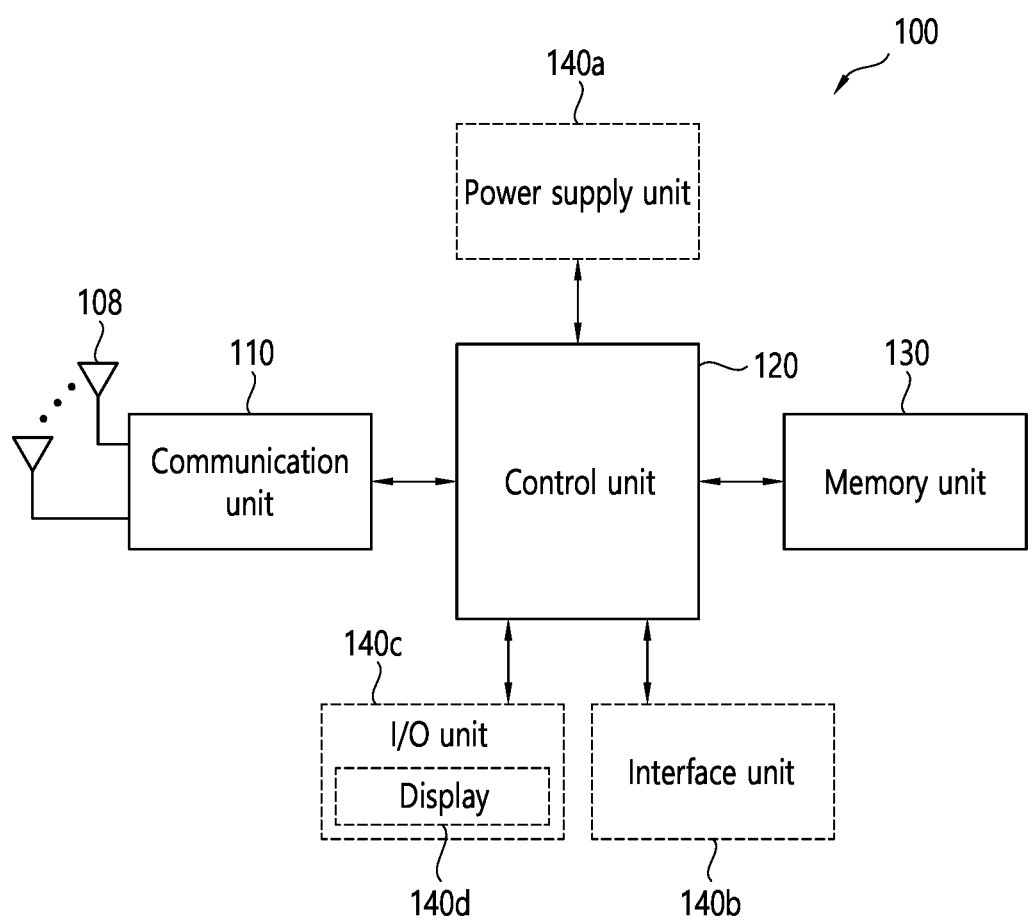
FIG. 31 shows a hand-held device to which the present specification is applied.

FIG. 31 shows a hand-held device to which the present specification is applied. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 31, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110-130/140a-140c correspond to the blocks 110-130/140 of FIG. 30, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/instructions (or commands) needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 32:
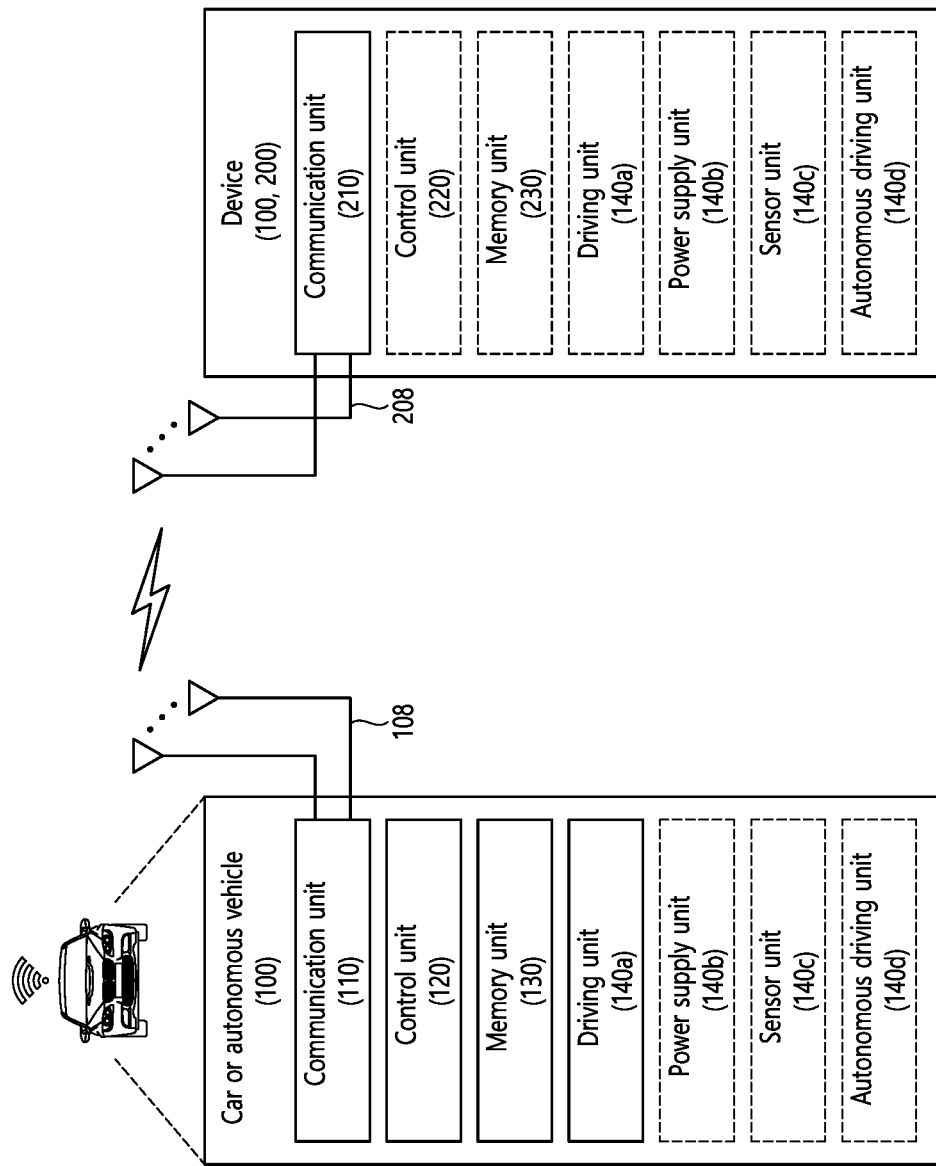
FIG. 32 shows a vehicle or an autonomous vehicle to which the present specification is applied.

FIG. 32 shows a vehicle or an autonomous vehicle to which the present specification is applied. The vehicle or autonomous vehicle may be implemented by a mobile robot, a car, a train, a manned/unmanned Aerial Vehicle (AV), a ship, and so on.

Referring to FIG. 32, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 30, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and so on.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Claims in the present specification may be combined in various ways. For instance, technical features in method claims of the present specification may be combined to be implemented or performed in an apparatus (or device), and technical features in apparatus claims may be combined to be implemented or performed in a method. Further, technical features in method claim(s) and apparatus claim(s) may be combined to be implemented or performed in an apparatus. Further, technical features in method claim(s) and apparatus claim(s) may be combined to be implemented or performed in a method.

What is claimed is:

1. A method of performing an Integrated Access and Backhaul (IAB) operation of an IAB node including an IAB-mobile terminal (MT) and an IAB-distributed unit (DU) in a wireless communication system, the method comprising:
    transmitting, to a parent node, request information;
    receiving, from the parent node, information on a timing case to be applied; and
    performing the IAB operation based on the information on the timing case to be applied,
    wherein, in a timing case 6, the IAB node sets a transmission time of the IAB-MT to a transmission time of the IAB-DU, and
    wherein the request information is used by the IAB node to inform the parent node whether the timing case 6 is required.

2. The method of claim 1, wherein the request information informs whether the timing case 6 is required for simultaneous operation.

3. The method of claim 1, wherein the IAB operation includes an IAB-MT operation and an IAB-DU operation,
    wherein the IAB-MT operation is an operation related to a communication between the LAB node and a parent node, and
    wherein the IAB-DU operation is an operation related to a communication between the IAB node and a child node or a communication between the IAB node and a terminal.

4. The method of claim 3, wherein the IAB-MT operation includes an IAB-MT transmission and an IAB-MT reception,
    wherein the IAB-DU operation includes an IAB-DU transmission and an IAB-DU reception.

5. The method of claim 1, wherein, in a timing case 1, the IAB node determines a time of the IAB-MT transmission based on timing advance (TA) configuration information which is provided.

6. The method of claim 5, wherein, in the timing case 1, a time of an IAB-DU transmission for the parent node is aligned with a time of the IAB-DU transmission for the IAB node.

7. The method of claim 1, wherein, in a timing case 7, the IAB node determines a time of the IAB-MT transmission based on both timing advance (TA) configuration information and additional TA configuration information which are provided.

8. The method of claim 7, wherein, in the timing case 7, a time of the IAB-DU reception for the IAB node is aligned with a time of the IAB-MT reception for the IAB node.

9. An Integrated Access and Backhaul (IAB) node including an IAB-mobile terminal (MT) and an IAB-distributed unit (DU), the IAB node comprising:
    at least one transceiver;
    at least one memory; and
    at least one processor operatively coupled with the at least one memory and the at least one transceiver, the at least one processor configured to:
    control the transceiver to transmit, to a parent node, request information;
    control the transceiver to receive, from the parent node, information on a timing case to be applied; and
    perform an IAB operation based on the information on the timing case to be applied,
    wherein, in a timing case 6, the IAB node sets a transmission time of the IAB-MT to a transmission time of the IAB-DU, and
    wherein the request information is used by the IAB node to inform the parent node whether the timing case 6 is required.

* * * * *